(12) United States Patent
Mu

(10) Patent No.: US 12,714,068 B2
(45) Date of Patent: Aug. 25, 2026

(54) BATH RACK

(71) Applicant: TAN GROW INC., Blue Island, IL (US)

(72) Inventor: Mengmeng Mu, Ningbo (CN)

(73) Assignee: TAN GROW INC., Blue Island, IL (US)

(*) Notice: Subject to any disclaimer, the term of this patent is extended or adjusted under 35 U.S.C. 154(b) by 0 days.

(21) Appl. No.: 19/185,299

(22) Filed: Apr. 22, 2025

(65) Prior Publication Data

US 2025/0248367 A1 Aug. 7, 2025

Related U.S. Application Data

(63) Continuation of application No. 18/151,394, filed on Jan. 6, 2023, now Pat. No. 12,302,858, which is a continuation-in-part of application No. 17/730,033, filed on Apr. 26, 2022, now Pat. No. 11,991,986.

(51) Int. Cl.
*A01K 13/00* (2006.01)
*A47K 3/062* (2006.01)

(52) U.S. Cl.
CPC ............ *A01K 13/001* (2013.01); *A47K 3/062* (2013.01)

(58) Field of Classification Search
CPC ...... A01K 13/00; A01K 13/001; A47K 3/062; A47K 3/024; A47K 3/164
See application file for complete search history.

(56) References Cited

U.S. PATENT DOCUMENTS 2,059,240 A * 11/1936 Johnston .................. A47D 7/00 182/20
4,763,368 A * 8/1988 Lucero ..................... A47D 7/00 5/100
5,794,570 A * 8/1998 Foster .................. A01K 13/001 119/673
7,921,812 B1 * 4/2011 Carrillo ................ A01K 13/001 119/602
8,091,294 B2 * 1/2012 Whalen .................. A01K 1/035 52/182
8,413,610 B1 * 4/2013 Fultz .................... A01K 13/001 119/665
12,495,766 B2 * 12/2025 Whitsett .............. A01K 13/001
2018/0206652 A1 * 7/2018 Gallina .................. A47D 9/012
2019/0375539 A1 * 12/2019 Mu ........................ F16M 11/38
2020/0046141 A1 * 2/2020 Mu ........................ A47D 9/005
2023/0117341 A1 * 4/2023 Mu ...................... A01K 13/001 119/600
2025/0248367 A1 * 8/2025 Mu ........................ A47K 3/062

FOREIGN PATENT DOCUMENTS

CN 115989794 A * 4/2023
CN 218921278 U * 4/2023
CN 110558882 B * 9/2023 ............. A47K 3/164
KR 20230001726 U * 8/2023 ........... A01K 13/001
WO WO-2025043429 A1 * 3/2025 ............... A47K 3/06

* cited by examiner

*Primary Examiner* — Ebony E Evans
(74) *Attorney, Agent, or Firm* — Che-Yang Chen

(57) ABSTRACT

A bath rack includes a rack body, a bathtub disposed on the rack body which is capable of supporting the bathtub to a predetermined height; and a foldable ladder pivotally installed on the rack body, so that a pet is allowed to enter and exit the bathtub at a high position through the foldable ladder by itself, so as to facilitate the user to clean the pet with a relatively large size by the bath rack.

14 Claims, 31 Drawing Sheets

BATH RACK

CROSS REFERENCE OF RELATED APPLICATION

This is a Continuation Application that claims the benefit of priority under 35 U.S.C. § 120 to a non-provisional application, application Ser. No. 18/151,394, filed on Jan. 6, 2023, which is a Continuation-In-Part application that claims the benefit of priority under 35 U.S.C. § 120 to a non-provisional application, application Ser. No. 17/730,033, filed on Apr. 26, 2022, which is a non-provisional application that claims the benefit of priority under 35 U.S.C. § 119 to Chinese application number CN 202111209234.3, filed Oct. 18, 2021, the entire contents of each of which are expressly incorporated herein by reference.

BACKGROUND OF THE PRESENT INVENTION

Field of Invention

The present invention relates to a bathing article, and more particularly to a bath rack.

Description of Related Arts

The Applicant herein has disclosed a foldable container in a China invention patent application with a publication number CN 110558882A, the foldable container includes a foldable supporting frame, an operation switch and a container body, the operation switch is arranged on the foldable supporting frame to allow the foldable supporting frame to move between an unfolded mode and a folded state by a pulling operation. The container body, which is mounted on the foldable supporting frame, defines an opening by an edge thereof. In the unfolded mode, the opening is open, and the opening is closed in the folded mode. The container body is able to be automatically folded up when the foldable supporting frame is moved from the unfolded mode to the folded mode, and the container body is automatically unfolded when the foldable supporting frame is moved from the folded mode to the unfolded mode, so that when in the folded mode, a space occupied by the foldable container is significantly reduced to save space for storing the foldable container. When in the unfolded mode, the foldable supporting frame is able to support the container body at a suitable height for facilitating a user to use the container body to clean a pet. It should be understood that when the foldable supporting frames is moved from the folded mode to the unfolded mode, the container body is able to be automatically unfolded along with the unfolding of the foldable supporting frame and is automatically supported at the suitable height. When the foldable container is unfolded, the container body may be supported at a relatively high position, and it is not possible for the pet to get into the container body at the relatively high position by itself, so that the user has to carry the pet to the container at the relatively high position. When the pet is relatively heavy, it is difficult for the user to pick up the pet and put the pet into the container body, especially for the pets with large or medium sized bodies such as Alaskans, Sheepdogs, Samoyeds, etc., for their weight in adulthood can reach more than 20K g.

SUMMARY OF THE PRESENT INVENTION

The invention is advantageous in that it provides a bath rack allowing a pet to enter and exit a bathtub at a high position by itself, so as to facilitate a user to use the bath rack to clean the pet in the bathtub.

Another advantage of the present invention is to provide a bath rack which provides a rack body and a foldable ladder, wherein after the foldable ladder is unfolded, the pet, by itself, is allowed to enter and exit the bathtub supported at a desired height by the rack body through the foldable ladder.

Another advantage of the present invention is to provide a bath rack, wherein the bathtub comprises a swinging end portion that its height can be reduced, so as to allow the pet to enter and exit the bathtub through the lowered swinging end portion.

Another advantage of the present invention is to provide a bath rack, wherein the foldable ladder can be independently folded and hidden under the bathtub, so as to avoid an adverse affect of the foldable ladder on the pet bathing process when the user uses the bath rack to clean the pet in the bathtub.

Another advantage of the present invention is to provide a bath rack, wherein the foldable ladder can be detachable, so as to avoid the adverse affect of the foldable ladder on the pet bathing process when the user uses the bath rack to clean the pet in the bathtub.

Another advantage of the present invention is to provide a bath rack, wherein a height of at least an end portion of the bathtub is able to be reduced, so as to allow the pet to enter and exit the bathtub through the foldable ladder, and when the pet enters the bathtub, the height position of the end portion can be reset to its original position, so as to retain sufficient water or cleaning liquid in the bathtub. As an example, the bathtub comprises the swinging end portion that lower or reset its height position through a downward or upward swinging moving manner.

Another advantage of the present invention is to provide a bath rack, wherein the rack body can be folded without requiring to detach the foldable ladder from the rack body, so that both of the rack body and the foldable ladder can be moved into the folded state, so as to form a compact folded storing structure.

Another advantage of the present invention is to provide a bath rack, wherein the foldable ladder is mounted to the rack body by a mounting rod which is rotatably mounted on two longitudinal extending legs, so as to allow the foldable ladder which is in the folded state to be hanging on the rack body under the bathtub.

Another advantage of the present invention is to provide a bath rack, wherein when the foldable ladder is in the unfolded state, the foldable ladder form a plurality of rectangular frames that is supported on the ground, so as to ensure a stable support to the pet which steps on the foldable ladder to enter the bathtub.

Another advantage of the present invention is to provide a bath rack, wherein the stability of the foldable ladder in the unfolded state can be further enhanced by a bracking arm which is braced on the bottom horizontal bar and the bottom longitudinal bar.

Another advantage of the present invention is to provide a bath rack, wherein the foldable ladder in the folded state, a locking unit can be in a locked state so as to overlappedly align the horizontal bars of the foldable ladder into a compact structure.

Another advantage of the present invention is to provide a bath rack, wherein the bathtub is mounted to the opening frame of the rack body to enable that the opening of the bathtub is defined and mainted by the opening frame and the surrounding wall of the bathtub is flatly extended.

Additional advantages and features of the invention will become apparent from the description which follows, and may be realized by means of the instrumentalities and combinations particularly pointing out in the appended claims.

According to the present invention, the foregoing and other objects and advantages are attained by a. bath rack for pet bathing, comprising:

a rack body;

a bathtub disposed on the rack body which is capable of supporting the bathtub to a predetermined height; and a foldable ladder comprising an installation end portion installed on the rack body and a standing end portion opposite to the installation end portion adapted for standing on a ground.

According to one embodiment of the present invention, the rack body comprises two supporting members, an opening frame and a holding supporter, wherein the two supporting members are arranged symmetrically, and two opposite sides of the opening frame are respectively arranged on tops of the two supporting members, wherein two opposite sides of the holding supporter are respectively arranged on the two supporting members, wherein the bathtub comprises a bathtub bottom wall and a bathtub side wall upwardly extended from a periphery of the bathtub bottom wall, wherein the bathtub bottom wall is supported by the holding supported, wherein the bathtub side wall has a top edge connected to the opening frame, wherein the installation end portion of the foldable ladder is installed on one end portion of the holding supporter.

According to one embodiment of the present invention, the bathtub comprises a swinging end portion which is configured to swing up and down to lower and reset a height position thereof, wherein the foldable ladder is located at a position below the swing end portion of the bathtub.

According to one embodiment of the present invention, the bathtub comprises a swinging end portion which is configured to swing up and down to lower and reset a height position thereof, wherein the foldable ladder is located at a position below the swing end portion of the bathtub.

According to one embodiment of the present invention, the opening frame comprises two connecting elements, a shaping bracket and an adjusting bracket, wherein each of the connecting elements, which is respectively disposed on a top of one the supporting member, comprises a shaping bracket connecting end and an adjusting bracket connecting end, wherein the shaping bracket is curvedly extended, and two opposite ends of the shaping brackets are respectively mounted to the shaping bracket connecting ends of each of the connecting elements, wherein the adjusting brackets is curvedly extended and two opposite ends of the adjusting bracket are respectively pivotally mounted to the adjusting bracket connecting end of each of the connecting members, wherein the bathtub sidewall of the bathtub is flexible and a first part of the top edge of the bathtub sidewall is connected to the shaping bracket, and a second part thereof is connected to the adjusting bracket.

According to one embodiment of the present invention, the rack body further comprises at least one locking member comprising a first locking arm and a second locking arm movably connected to the first locking arm, wherein the first locking arm is pivotally mounted to one the supporting member, wherein the second locking arm is fixedly mounted to the adjusting bracket, wherein a connection position between the first locking arm and the second locking arm can be locked or released.

According to one embodiment of the present invention, the at least one locking member further comprises a locking element, wherein the first locking arm has a sliding groove, wherein an end portion of the second locking arm has a first locking groove, and the first locking the arm and the second locking arm are pivotally mounted, and the first locking groove of the second locking arm is capable of being aligned with the sliding groove of the first locking arm, wherein the locking element is slidably disposed in the sliding groove of the first locking arm, and the locking element is allowed to slide into or out of the first locking groove of the second locking arm.

According to one embodiment of the present invention, a side of the second locking arm has a second locking groove which is capable of being aligned with the sliding groove of the first locking element, wherein the locking element is allowed to slide into or out of the second locking groove of the second locking arm.

According to one embodiment of the present invention, the at least one locking member further comprises an operation element sheathed on an outside of the first locking arm, and the locking element is provided on the operation element.

According to one embodiment of the present invention, the rack body is foldable.

According to one embodiment of the present invention, each of the supporting members comprises a first supporting leg and a second supporting leg, wherein tops of the first supporting leg and the first supporting leg are respectively pivotally installed, wherein the holding supporter comprises a first holding bracket, a second holding bracket and a pivot mechanism, wherein an inner end portion of the first holding bracket is fixedly installed on the pivot mechanism, two opposite sides of the first holding bracket are respectively rotatably installed on the first supporting legs of the supporting members, wherein an inner end portion of the second holding bracket is pivotally mounted to the pivot mechanism, two opposite sides of the second holding bracket are respectively rotatably mounted to the second supporting legs of the supporting members.

According to one embodiment of the present invention, the pivot mechanism comprises a pivot element and a retaining element, wherein the pivot element has a pivot space and two limiting grooves communicated with the pivoting space through two opposite sides of the pivot element, wherein two opposite sides of the retaining element are respectively slidably installed in the limiting grooves of the pivot element, wherein the inner end portion of the first holding bracket is fixedly mounted to one end portion of the pivot element, and the inner end portion of the second holding bracket is pivotally mounted to the other end portion of the pivot element, wherein the inner end portion of the second holding bracket has a retaining groove that is capable of being aligned with the limiting grooves in the pivot space of the pivoting element, wherein the locking element is allowed to slide into or out of the retaining groove of the second holding bracket.

According to one embodiment of the present invention, the pivot mechanism comprises a pulling element and a restoring element, the pivoting element has a top through hole, and one end portion of the pulling element is mounted on the retaining element after passing through the top through hole of the pivot element, wherein the restoring element is retained between the pivot element and the locking element.

According to one embodiment of the present invention, the installation end portion of the foldable ladder is mounted to an outer end portion of the second holding bracket.

According to one embodiment of the present invention, two opposite ends of the shaping bracket are respectively pivotally mounted to the shaping bracket connecting end of each of the connecting elements.

According to one embodiment of the present invention, the bathtub bottom wall of the bathtub is flexible and is mounted to the holding supporter.

According to one embodiment of the present invention, the rack body further comprises a bracing member which comprises a first bracing element and a second bracing element pivotally connected to the first bracing element, wherein the first bracing element is pivotally mounted to one of the supporting members, wherein the second bracing element is fixedly mounted to an end portion of the shaping bracket.

According to another aspect of the present invention, the present invention provides a bath rack for pet bathing, comprising:

a rack body;

a bathtub disposed on the rack body which is capable of supporting the bathtub to a predetermined height, wherein the bathtub comprises a swinging end portion which is configured to swing up and down to lower and reset a height position thereof.

According to one embodiment of the present invention, the rack body comprises:

two supporting members which are arranged symmetrically;

a holding supporter, wherein two opposite sides of the opening frame are respectively arranged on the two supporting members; and an opening frame comprising two connecting elements, a shaping bracket and an adjusting bracket, wherein each of the connecting elements, which is respectively disposed on a top of one the supporting member, comprises a shaping bracket connecting end and an adjusting bracket connecting end, wherein the shaping bracket is curvedly extended, and two opposite ends of the shaping brackets are respectively mounted to the shaping bracket connecting ends of each of the connecting elements, wherein the adjusting brackets is curvedly extended and two opposite ends of the adjusting bracket are respectively pivotally mounted to the adjusting bracket connecting end of each of the connecting members, wherein the bathtub sidewall of the bathtub is flexible and a first part of the top edge of the bathtub sidewall is connected to the shaping bracket, and a second part thereof is connected to the adjusting bracket.

According to one embodiment of the present invention, each of the supporting members comprises a first supporting leg and a second supporting leg, wherein tops of the first supporting leg and the first supporting leg are respectively pivotally installed, wherein the holding supporter comprises a first holding bracket, a second holding bracket and a pivot mechanism, wherein an inner end portion of the first holding bracket is fixedly installed on the pivot mechanism, two opposite sides of the first holding bracket are respectively rotatably installed on the first supporting legs of the supporting members, wherein an inner end portion of the second holding bracket is pivotally mounted to the pivot mechanism, two opposite sides of the second holding bracket are respectively rotatably mounted to the second supporting legs of the supporting members, wherein two opposite ends of the shaping bracket are respectively pivotally mounted to the shaping bracket connecting ends of each of the connecting elements.

According to one embodiment of the present invention, the bathtub bottom wall of the bathtub is flexible and is mounted on the holding supporter.

The present invention further provides a bath rack for pet bathing, comprising a rack body, a bathtub disposed on the rack body which is capable of supporting the bathtub to a predetermined height, and a foldable ladder pivotally mounted to the rack body, wherein the foldable ladder is moved between an unfolded state for allowing the pet to enter the bathtub through the foldable ladder and a folded state in which the foldable ladder is folded and pivotally moved to a position under the bathtub.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
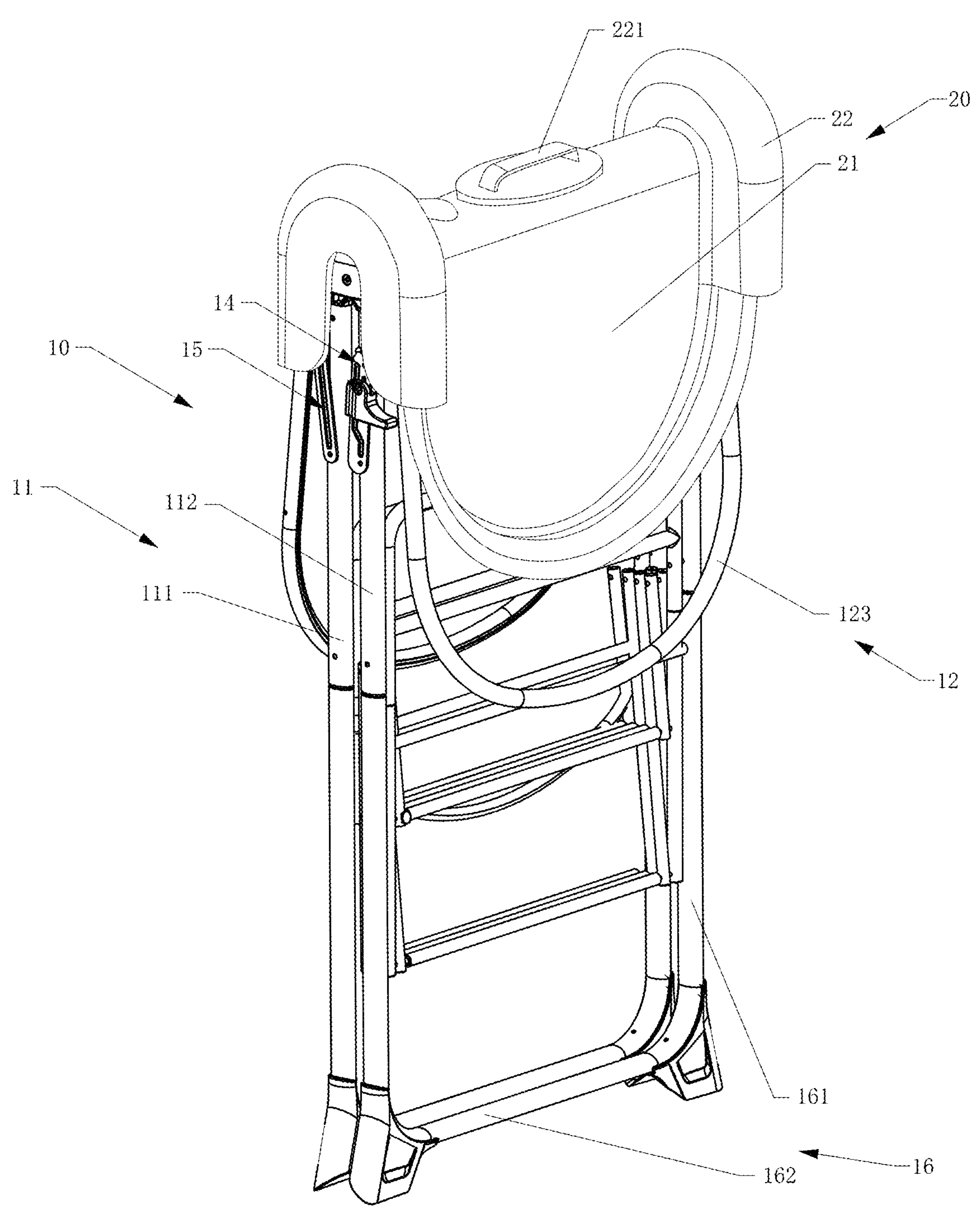
FIG. 1 is a perspective view of a bath rack in a folded state according to a preferred embodiment of the present invention.
Figure 2A:
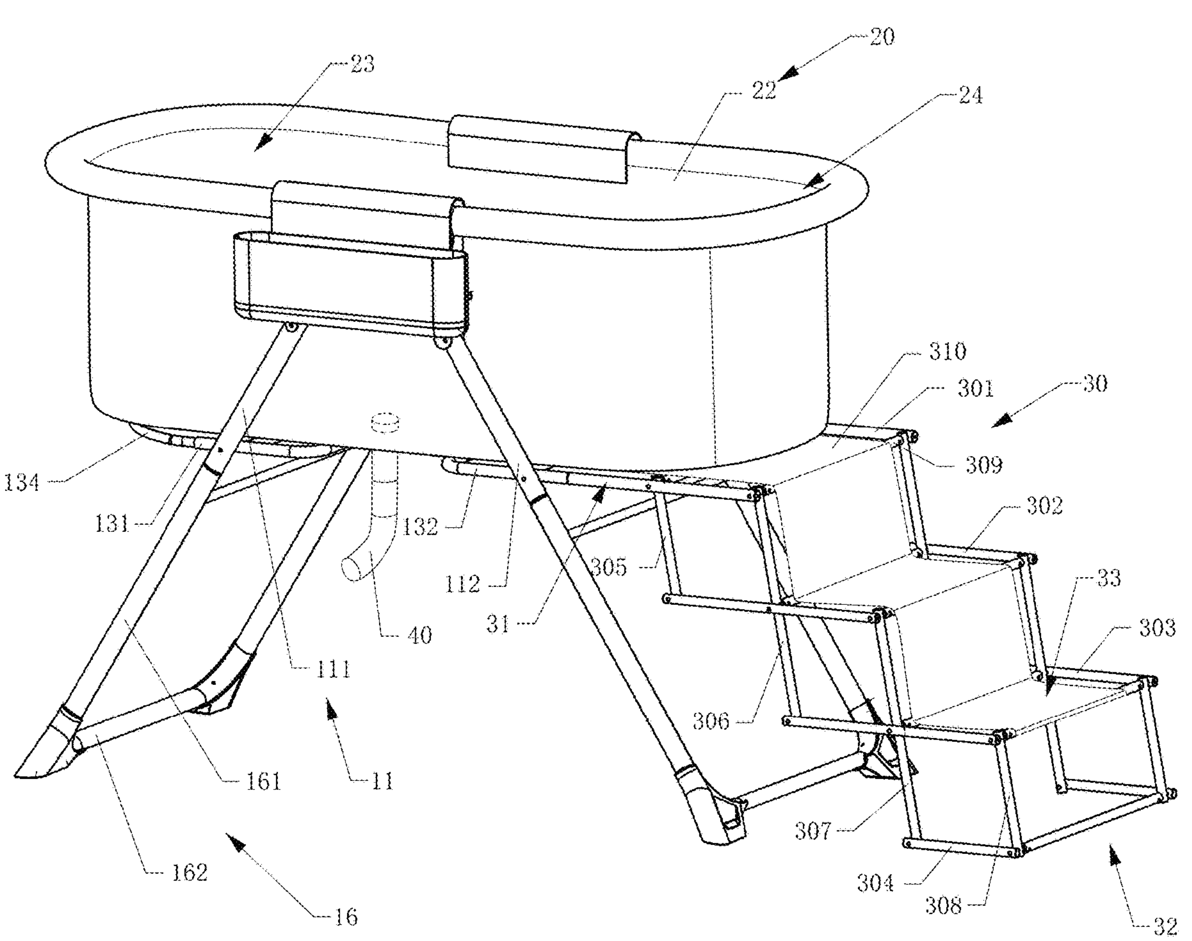
FIG. 2A and FIG. 2B are perspective views of different angles of views of the bath rack in a unfolded state according to the above preferred embodiment of the present invention.
Figure 2B:
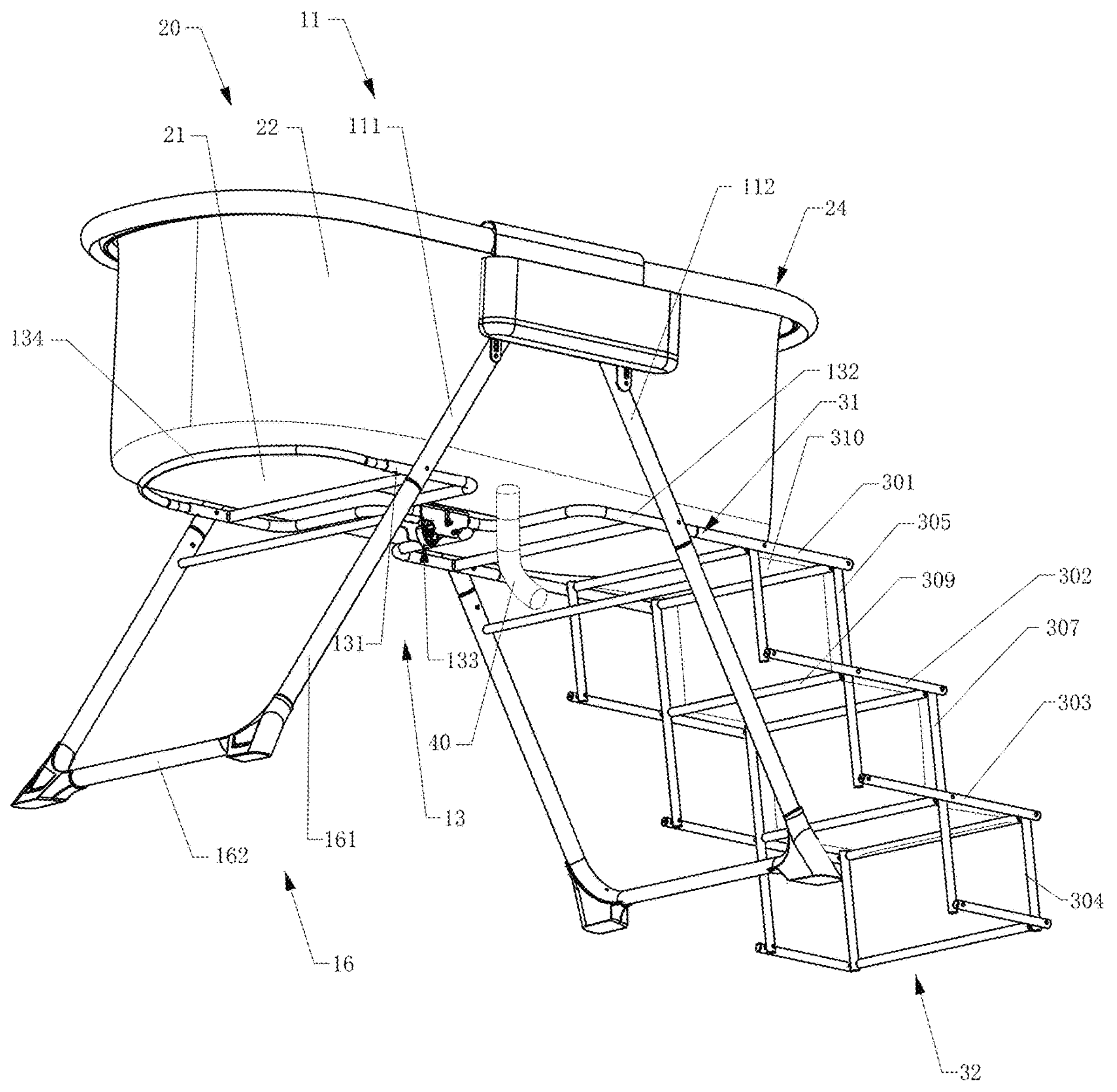
Figure 3:
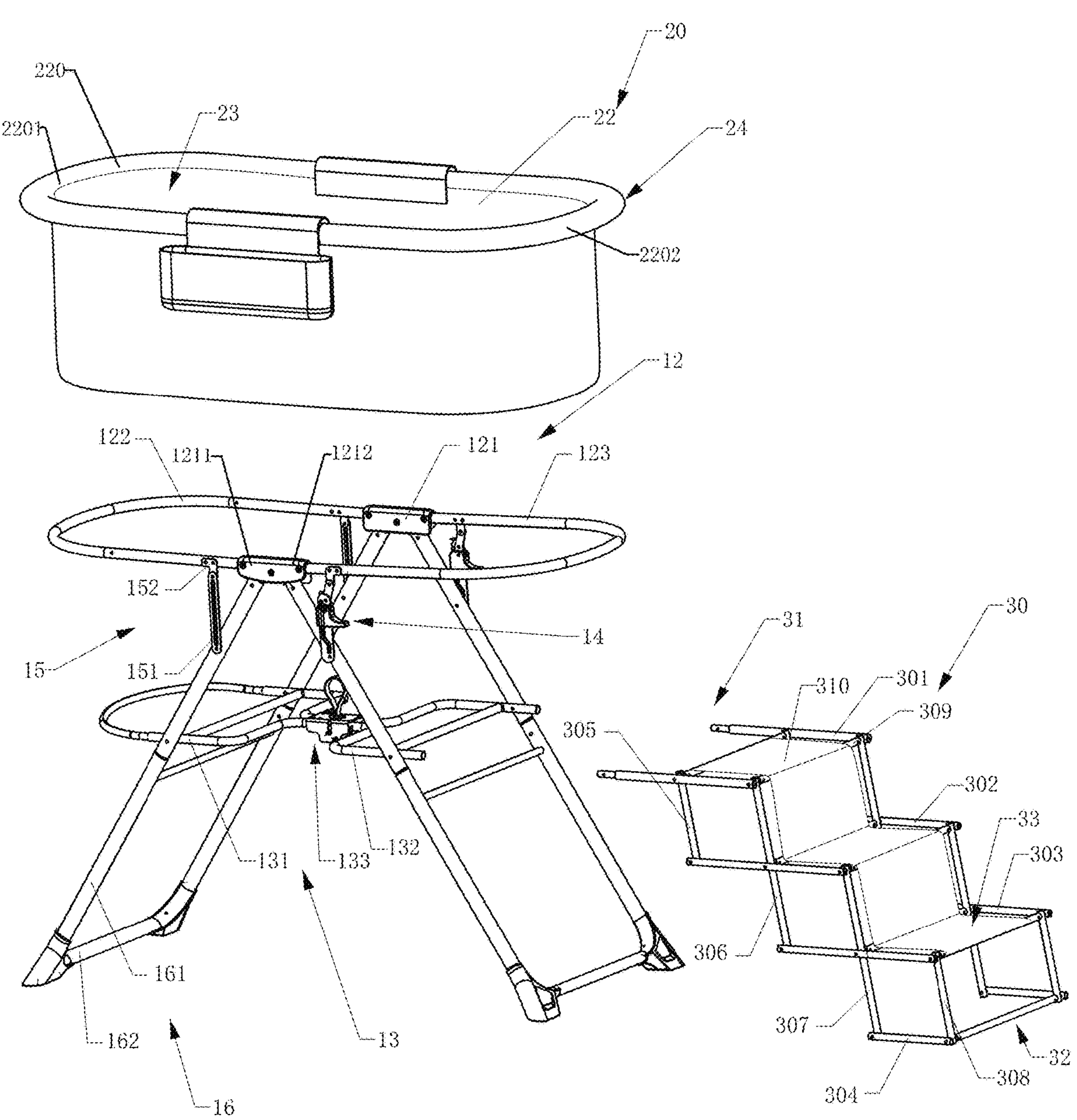
FIG. 3 is an exploded view of the bath rack according to the above preferred embodiment of the present invention.
Figure 4A:
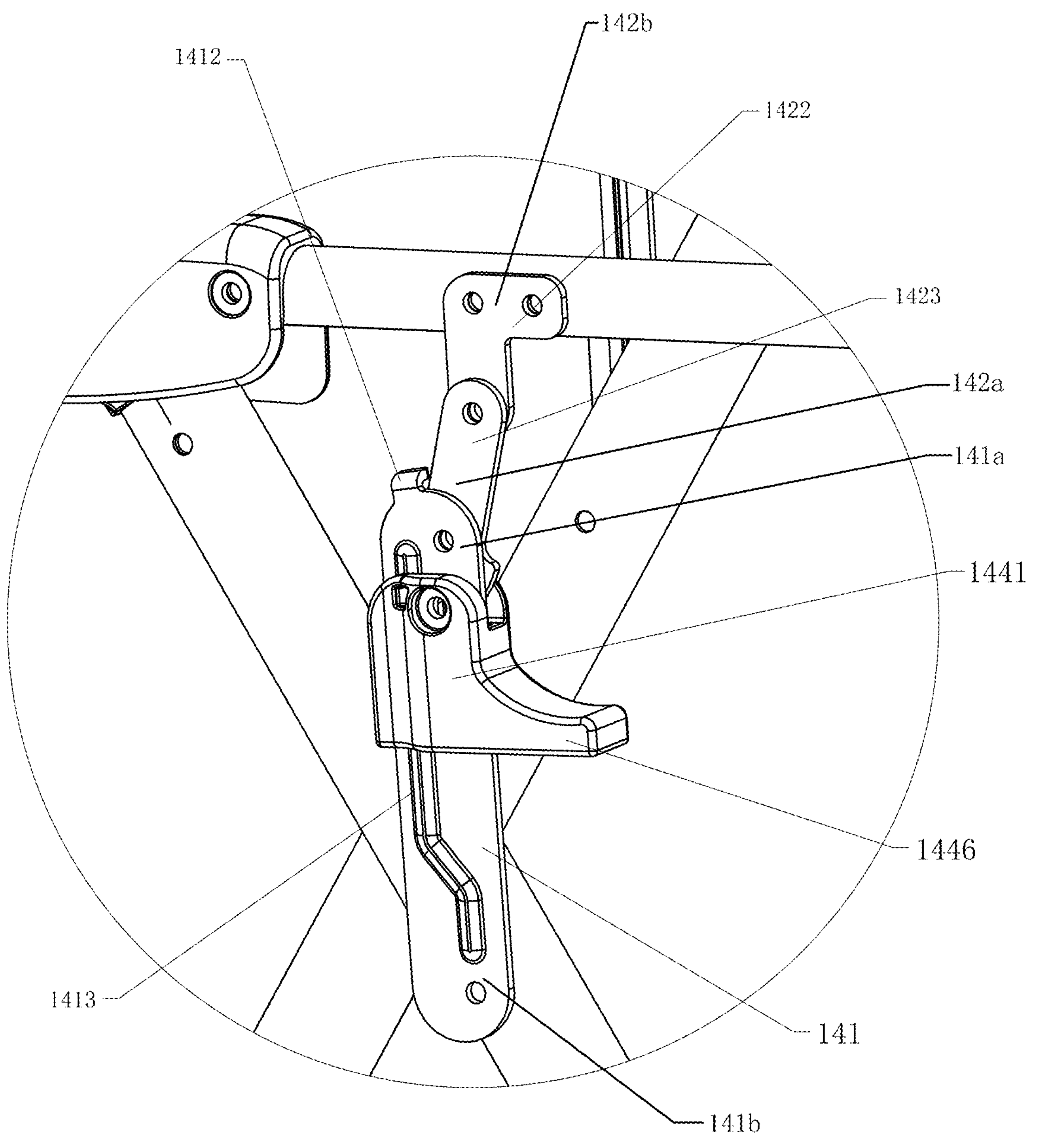
FIG. 4A is a partial enlarged view of a locking member in FIG. 3.
Figure 4B:
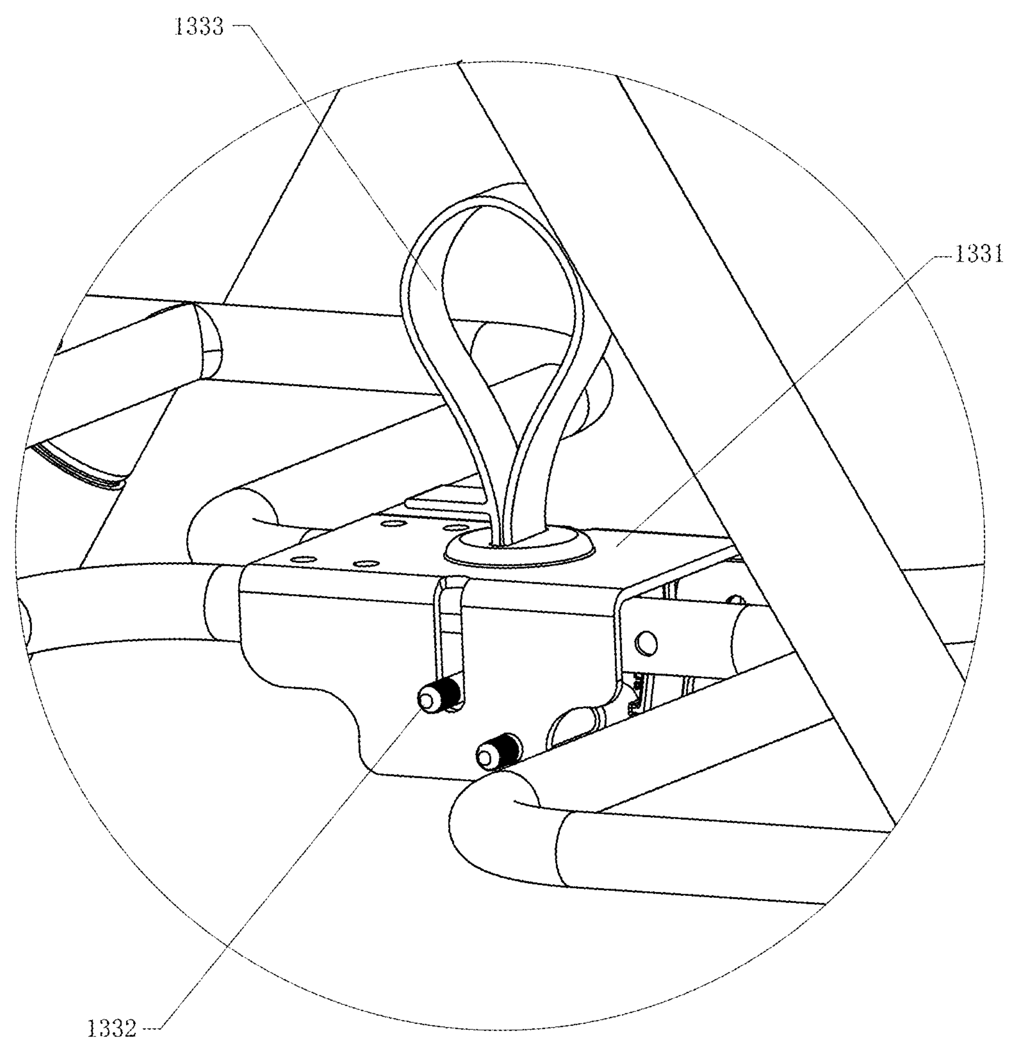
FIG. 4B is a partial enlarged view of a holding supporter in FIG. 3.
Figure 5:
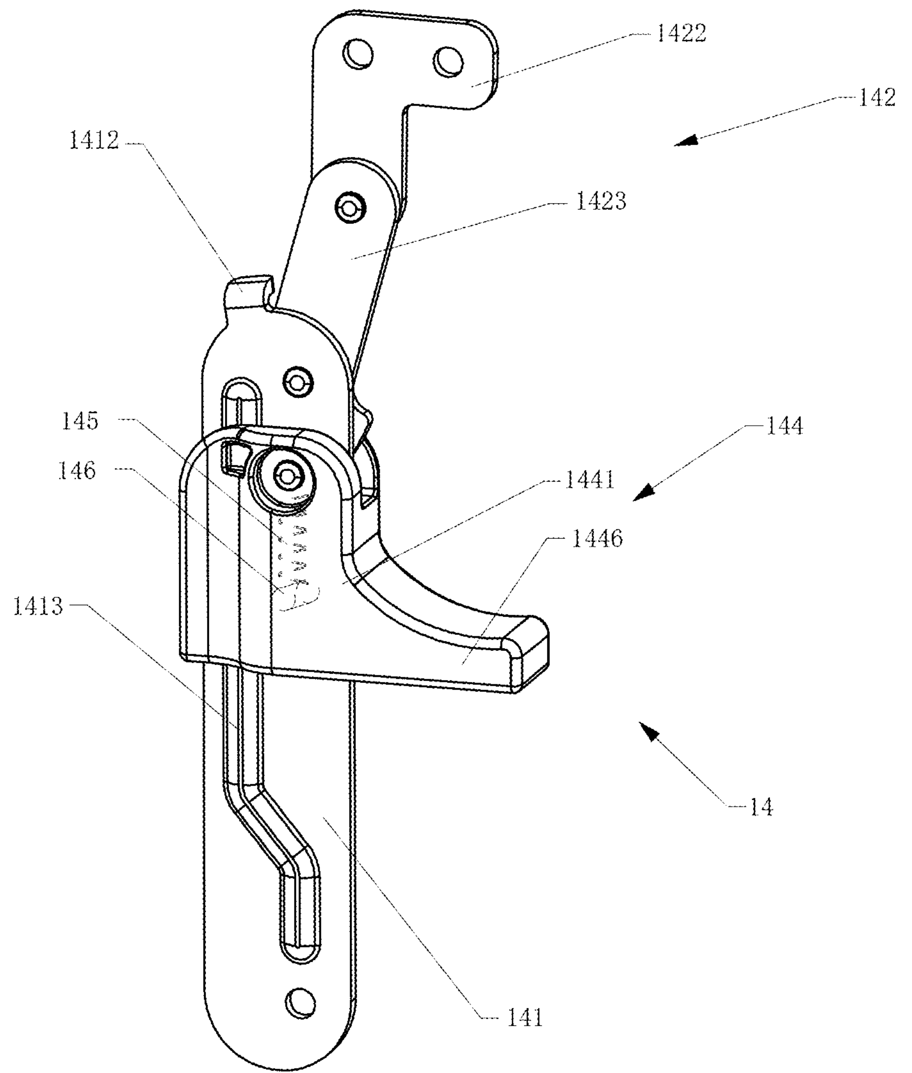
FIG. 5 is a perspective view of a locking member of the bath rack according to the above preferred embodiment of the present invention.
Figure 6A:
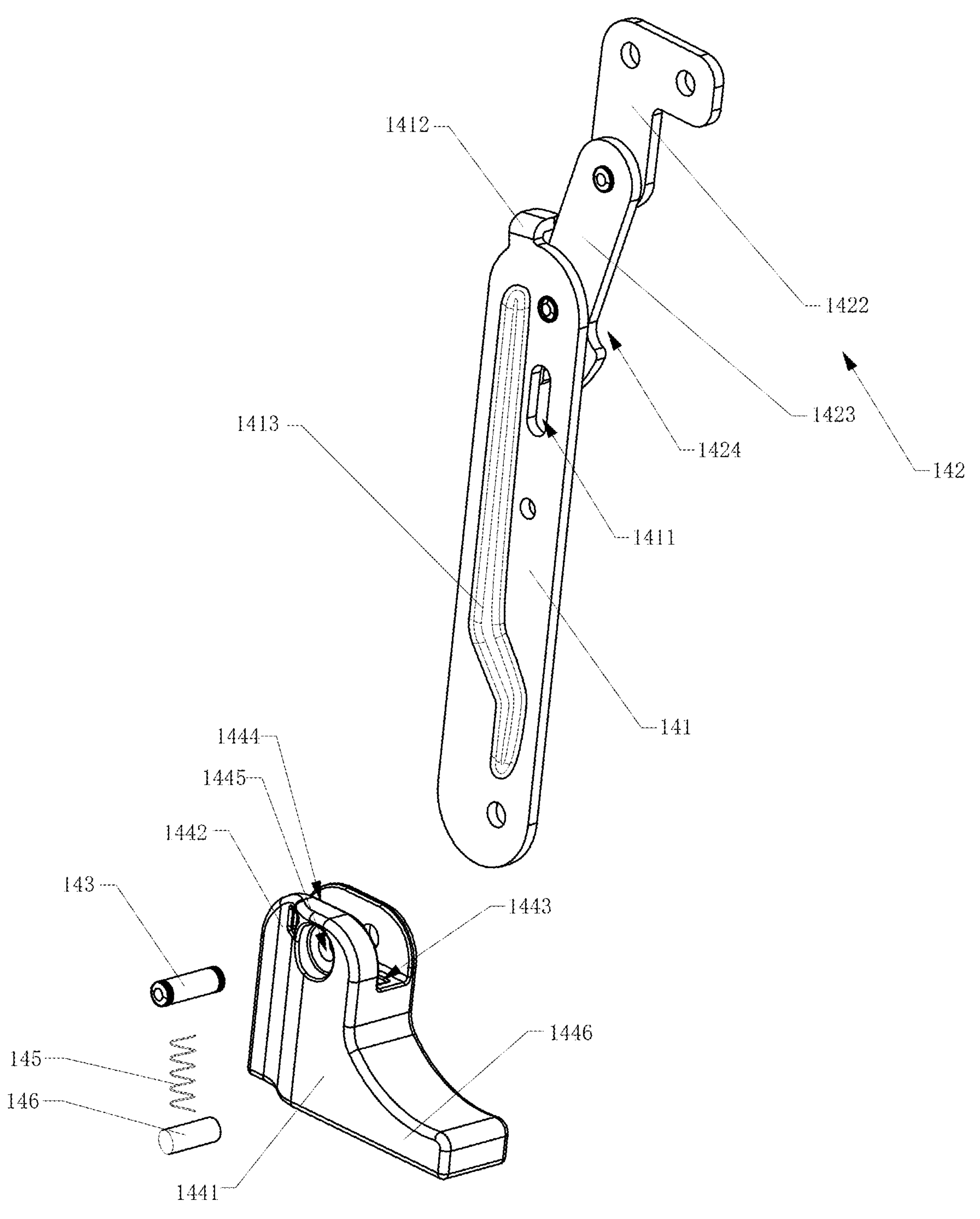
FIG. 6A and FIG. 6B are exploded views of different angles of views of the locking member of the bath rack according to the above preferred embodiment of the present invention.
Figure 6B:
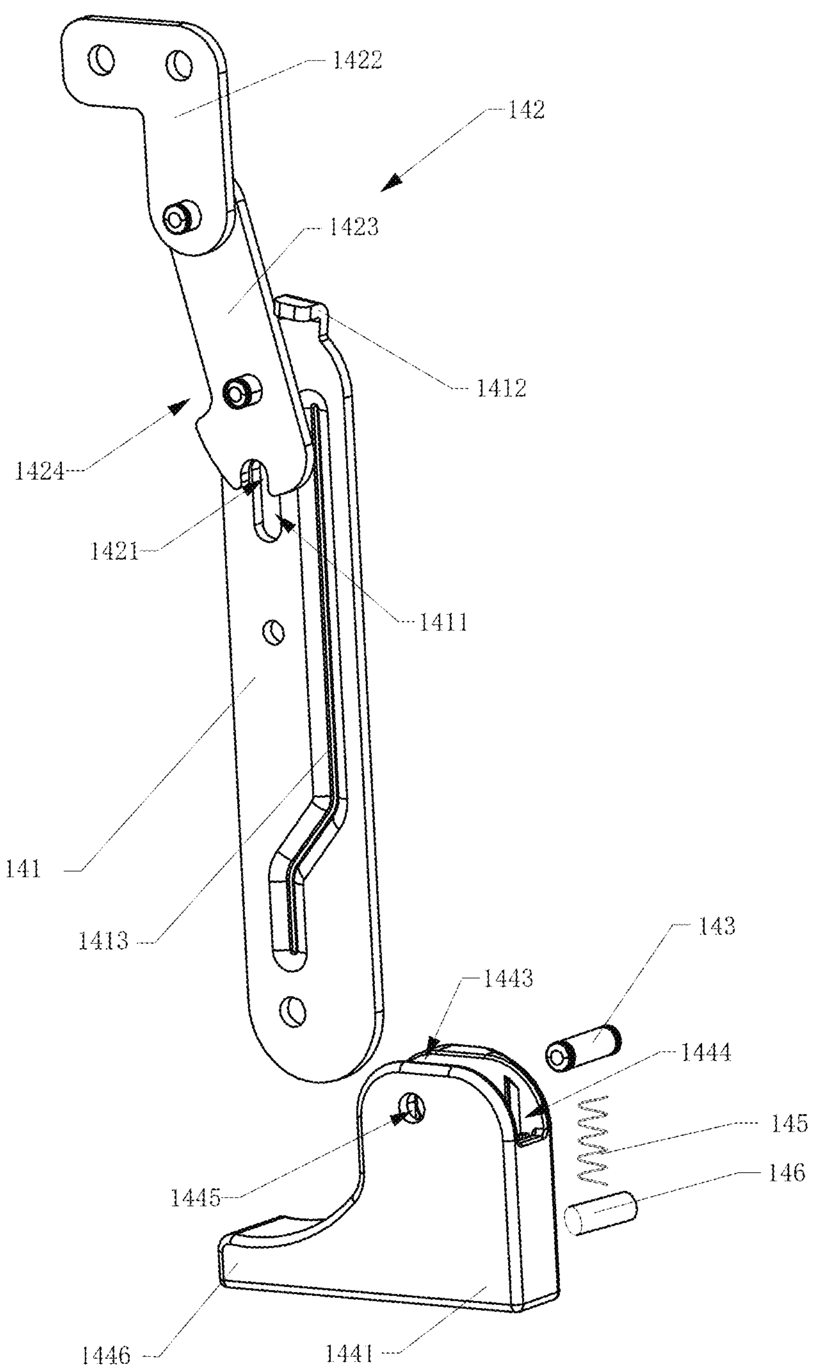
Figure 7:
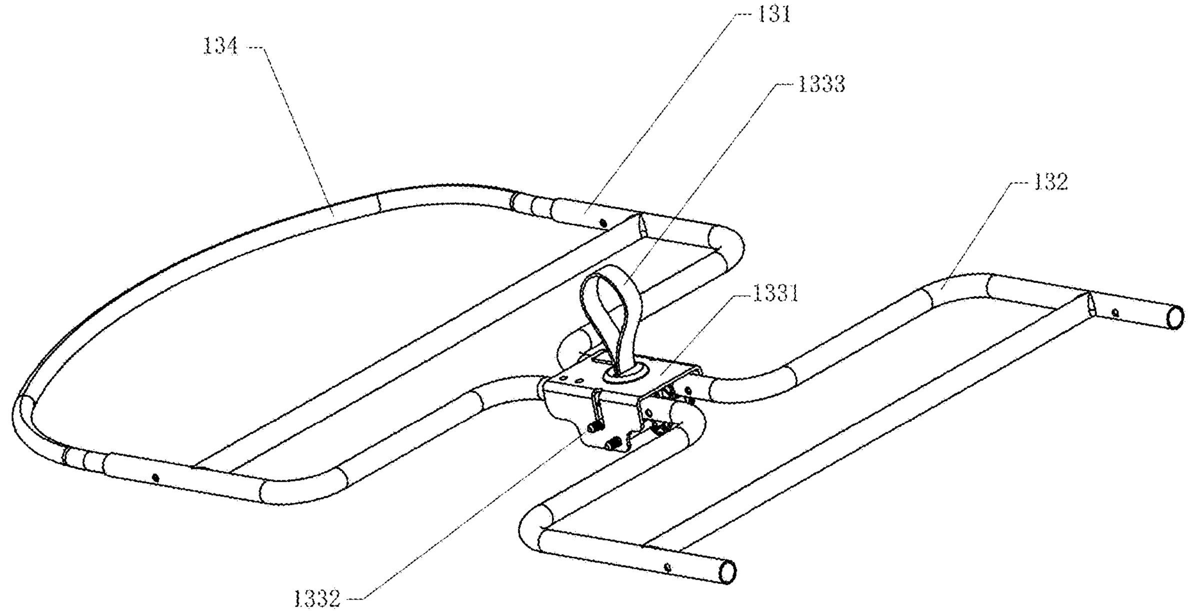
FIG. 7 is a perspective view of a holding supporter of the bath rack according to the above preferred embodiment of the present invention.
Figure 8:
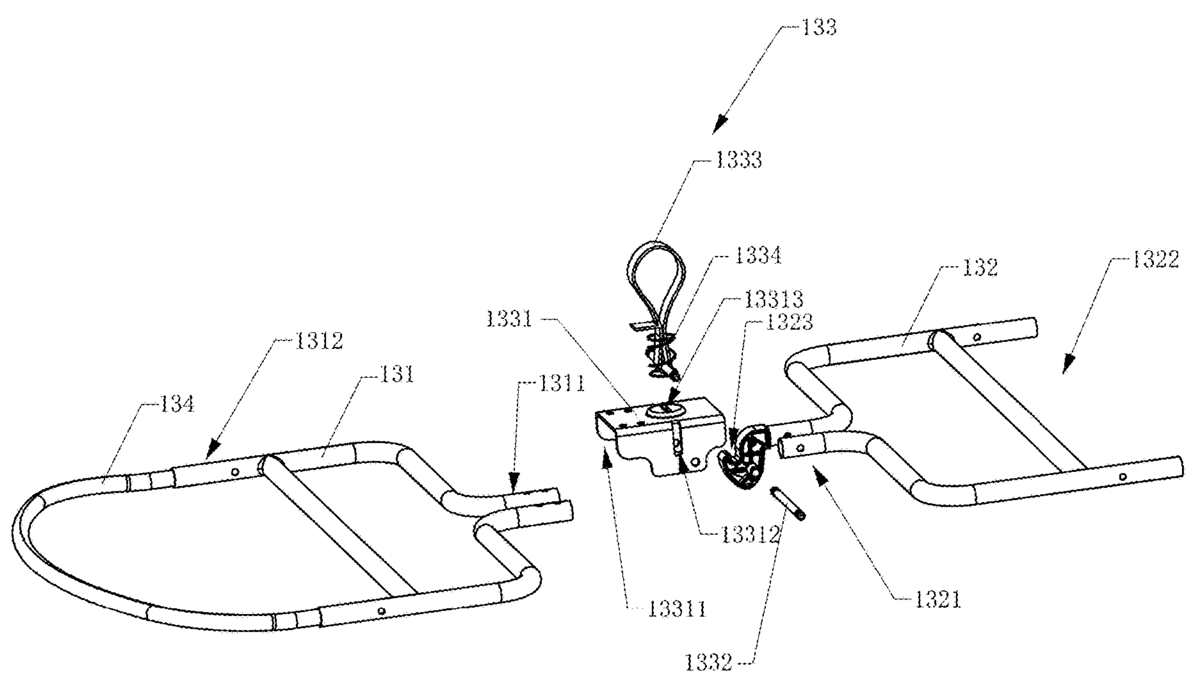
FIG. 8 is an exploded view of the holding supporter of the bath rack according to the above preferred embodiment of the present invention.
Figure 9A:
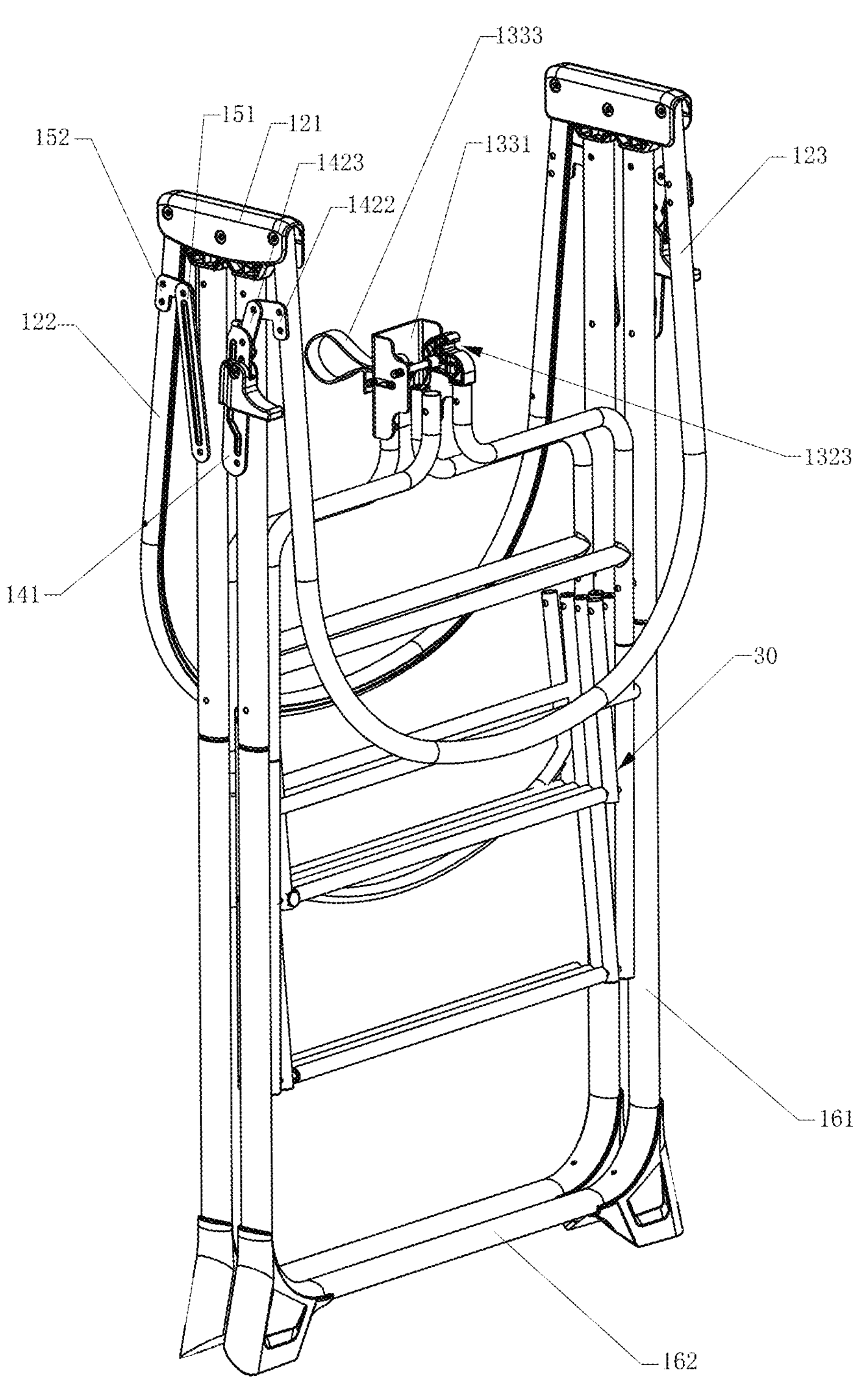
FIGS. 9A to 9E are respective perspective views illustrating an unfolding process of a rack body of the bath rack according to the above preferred embodiment of the present invention.
Figure 9B:
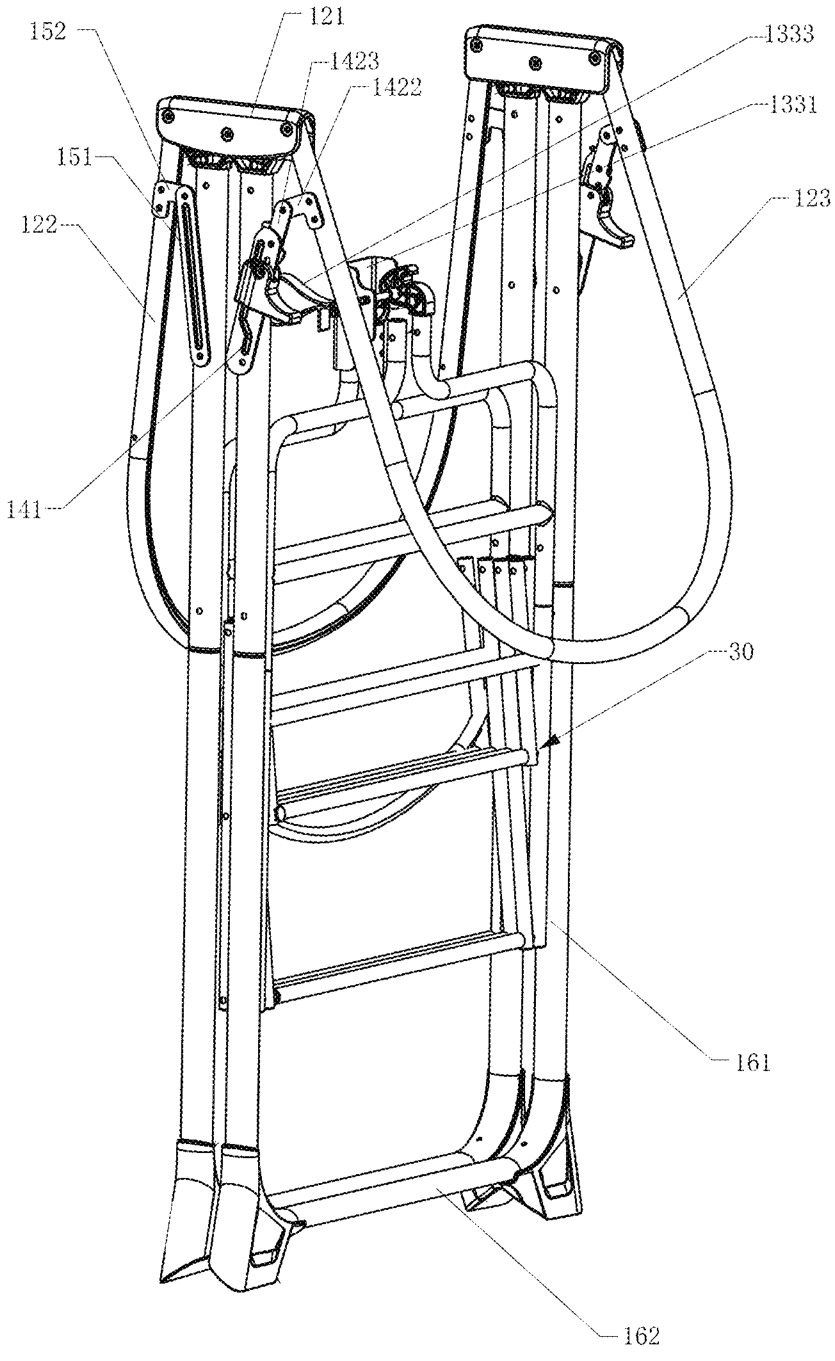
Figure 9C:
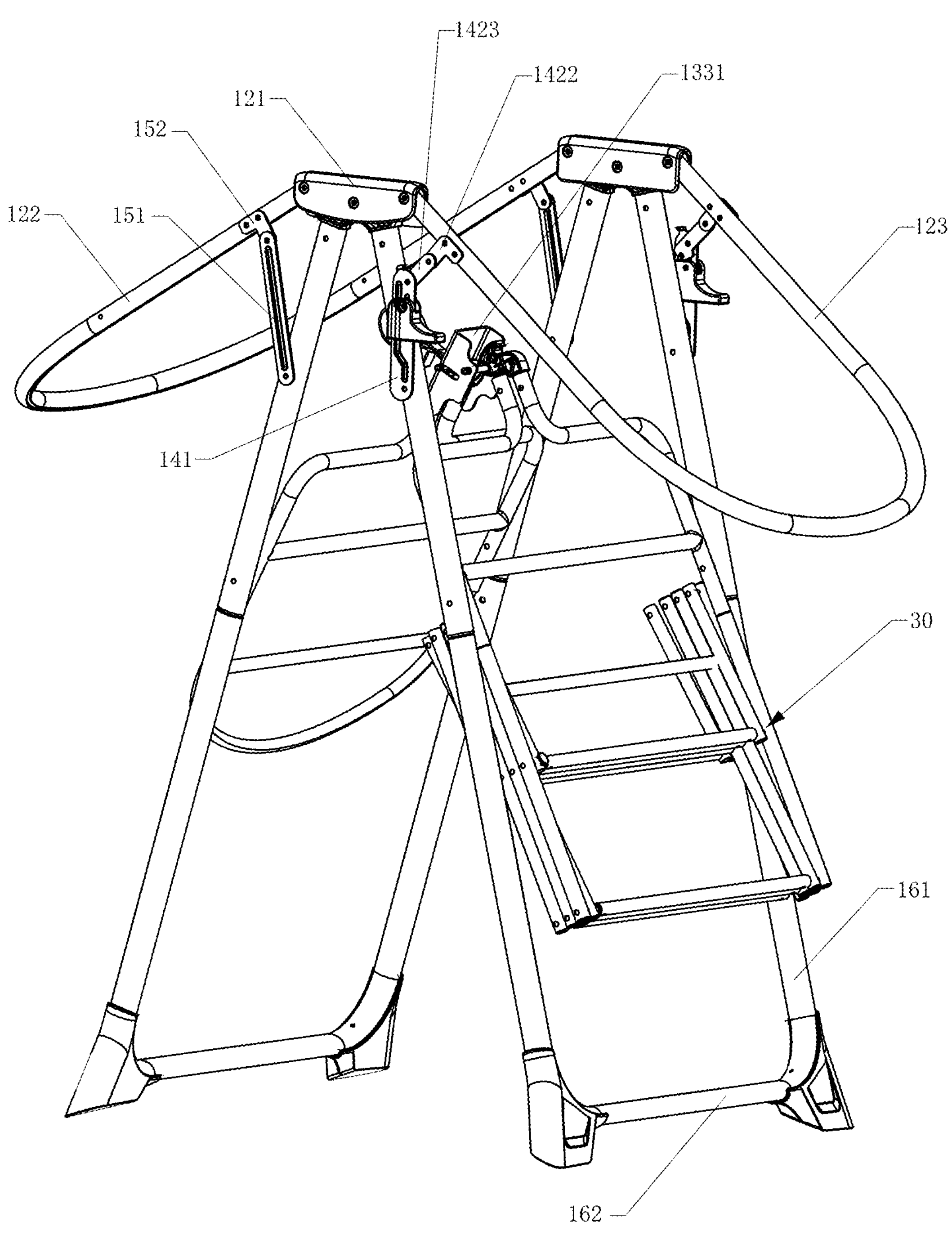
Figure 9D:
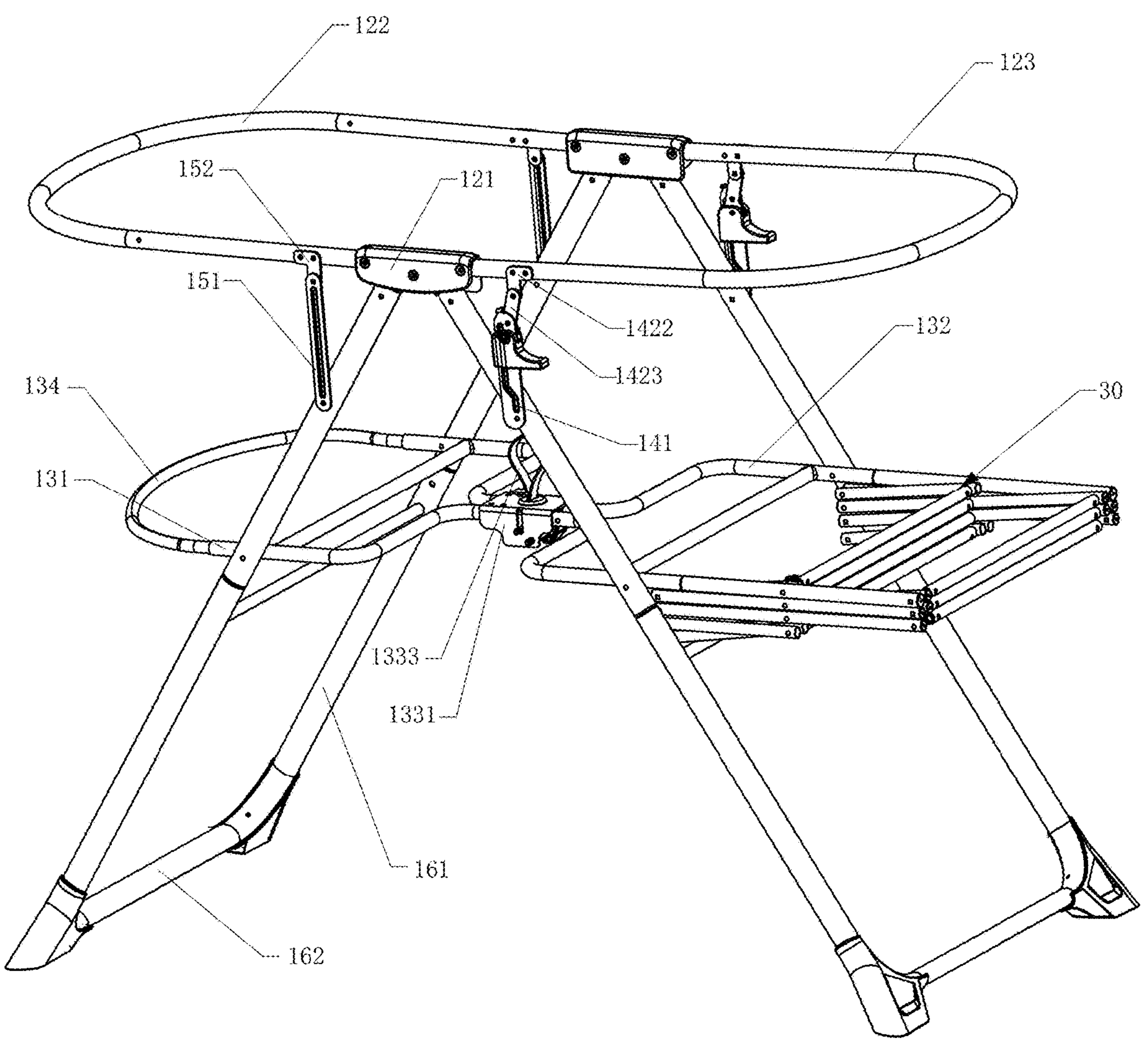
Figure 9E:
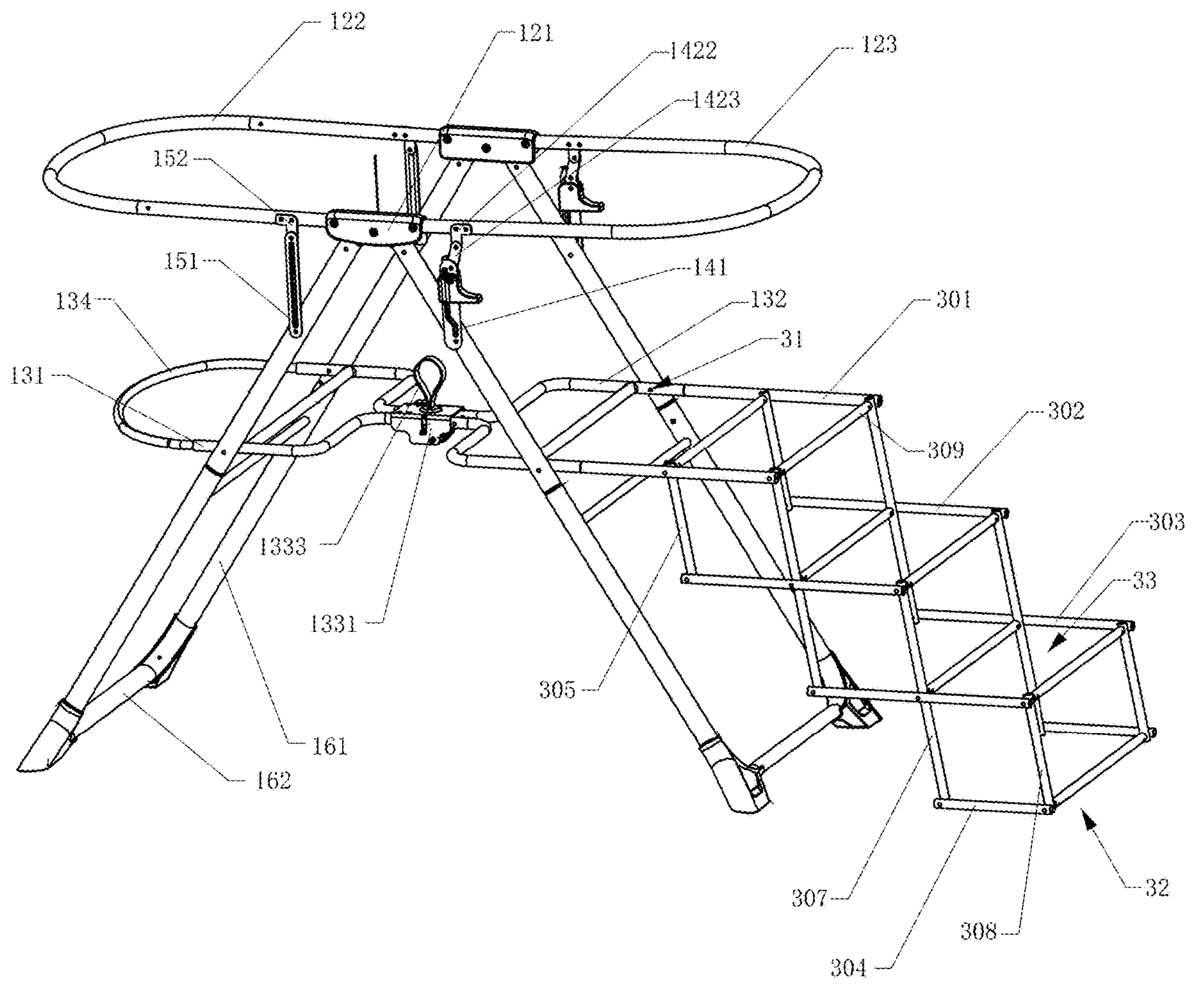
Figure 10A:
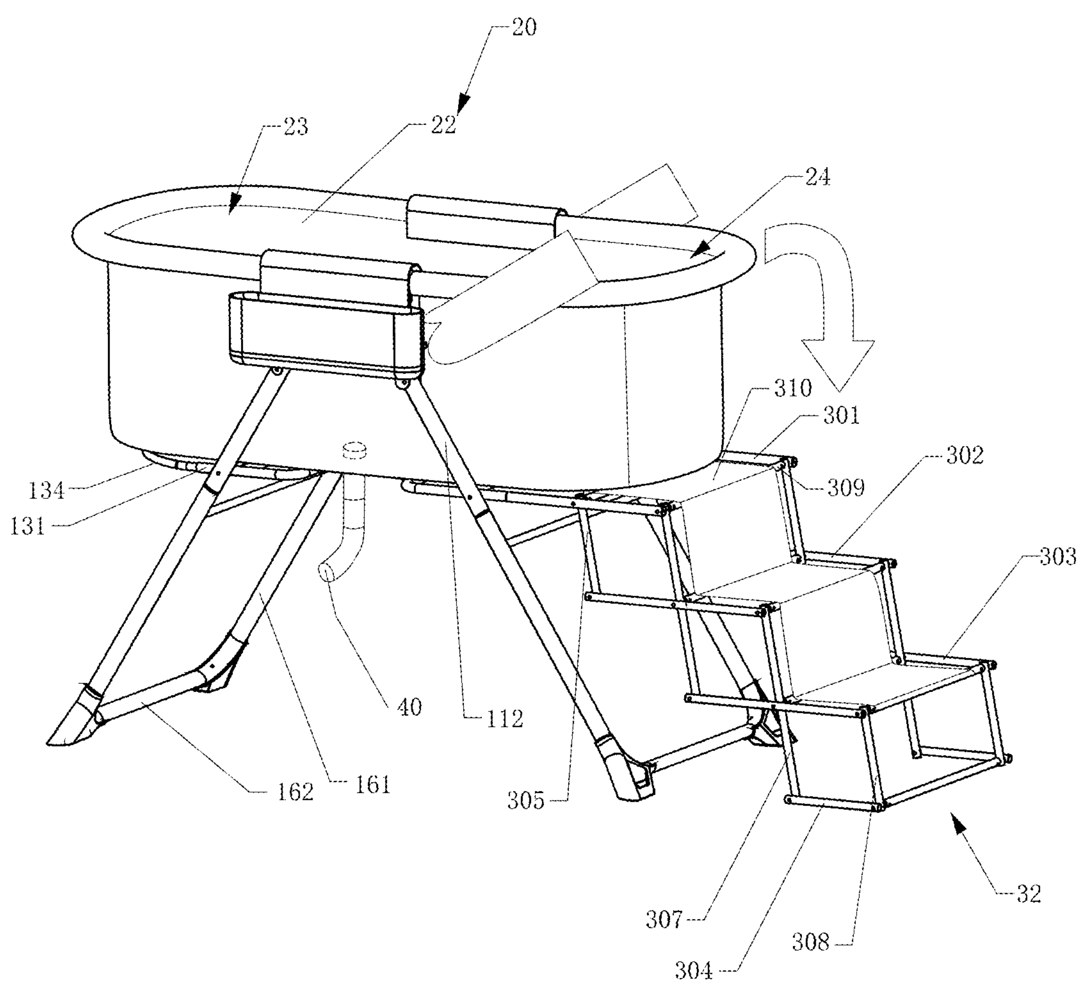
FIGS. 10A to 10E are perspective views illustrating the bath rack being used for pet bathing according to the above preferred embodiment of the present invention.
Figure 10B:
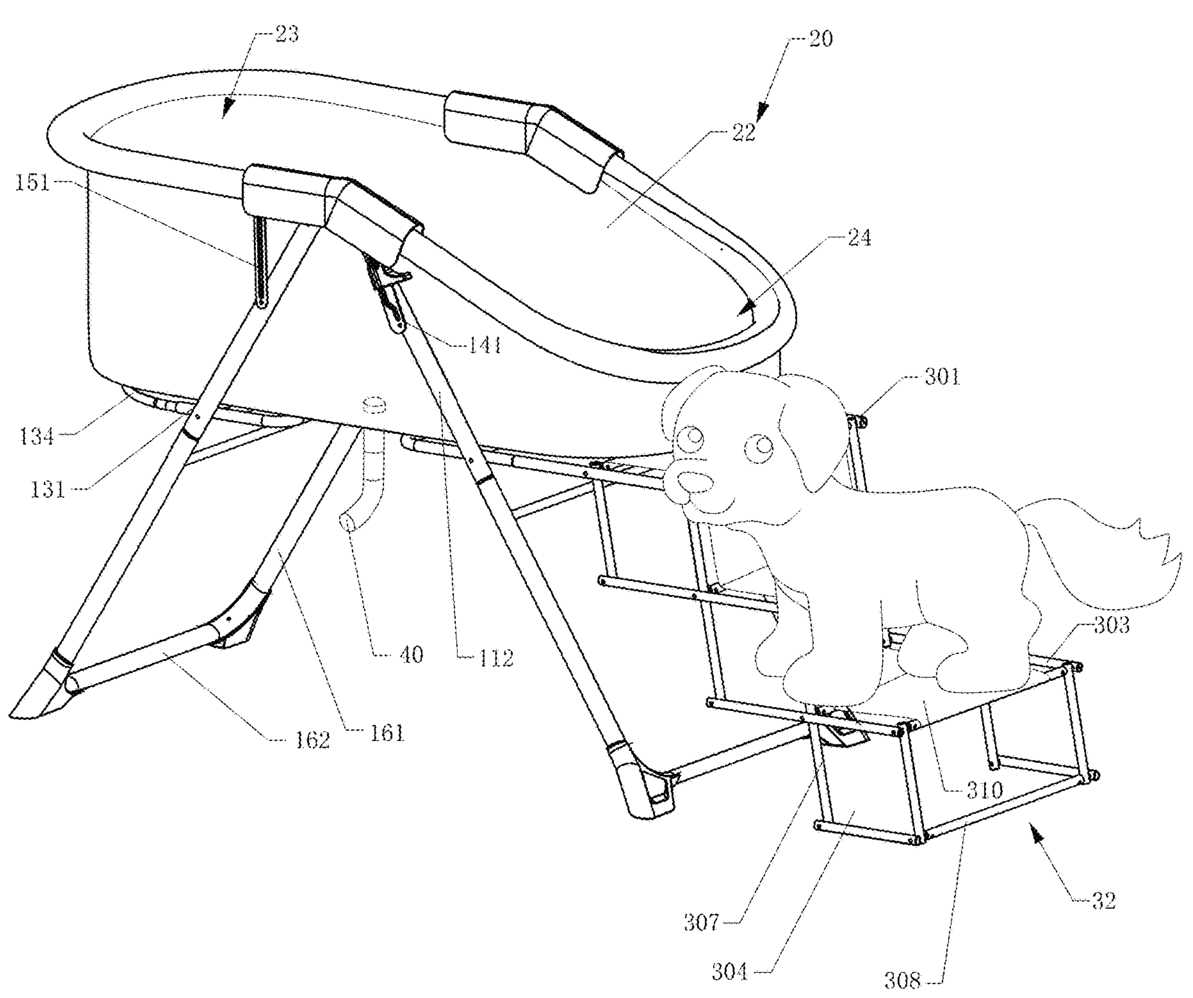
Figure 10C:
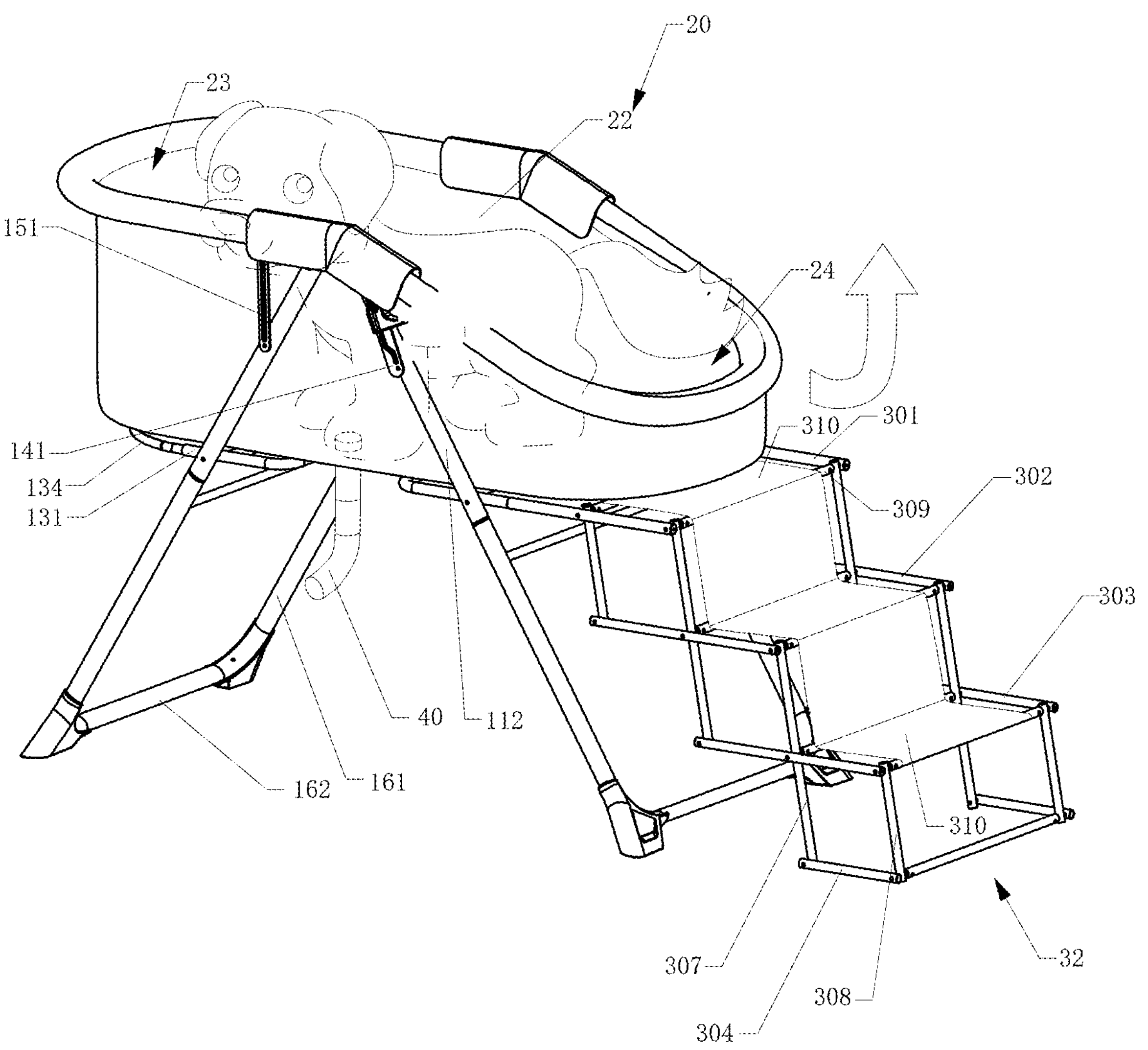
Figure 10D:
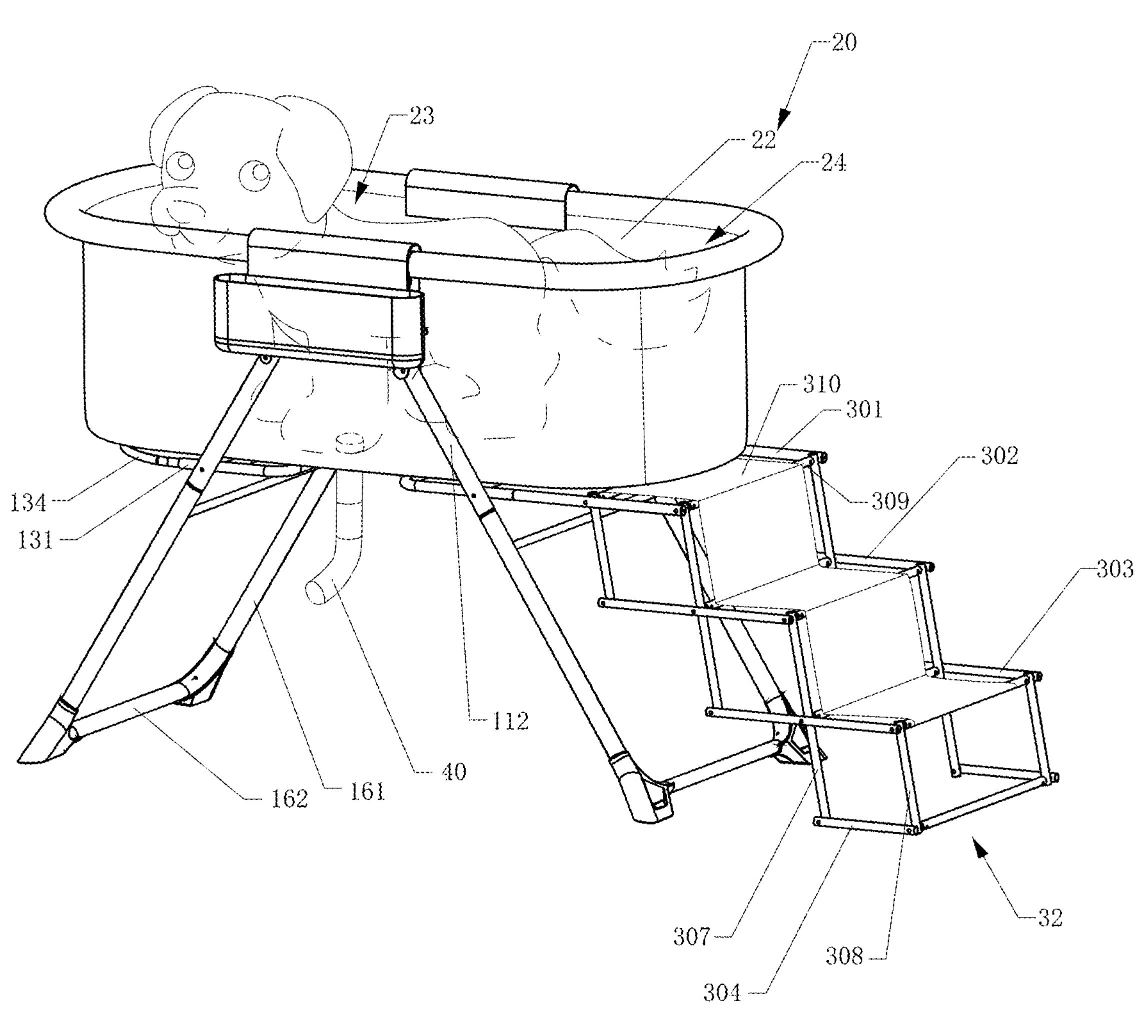
Figure 10E:
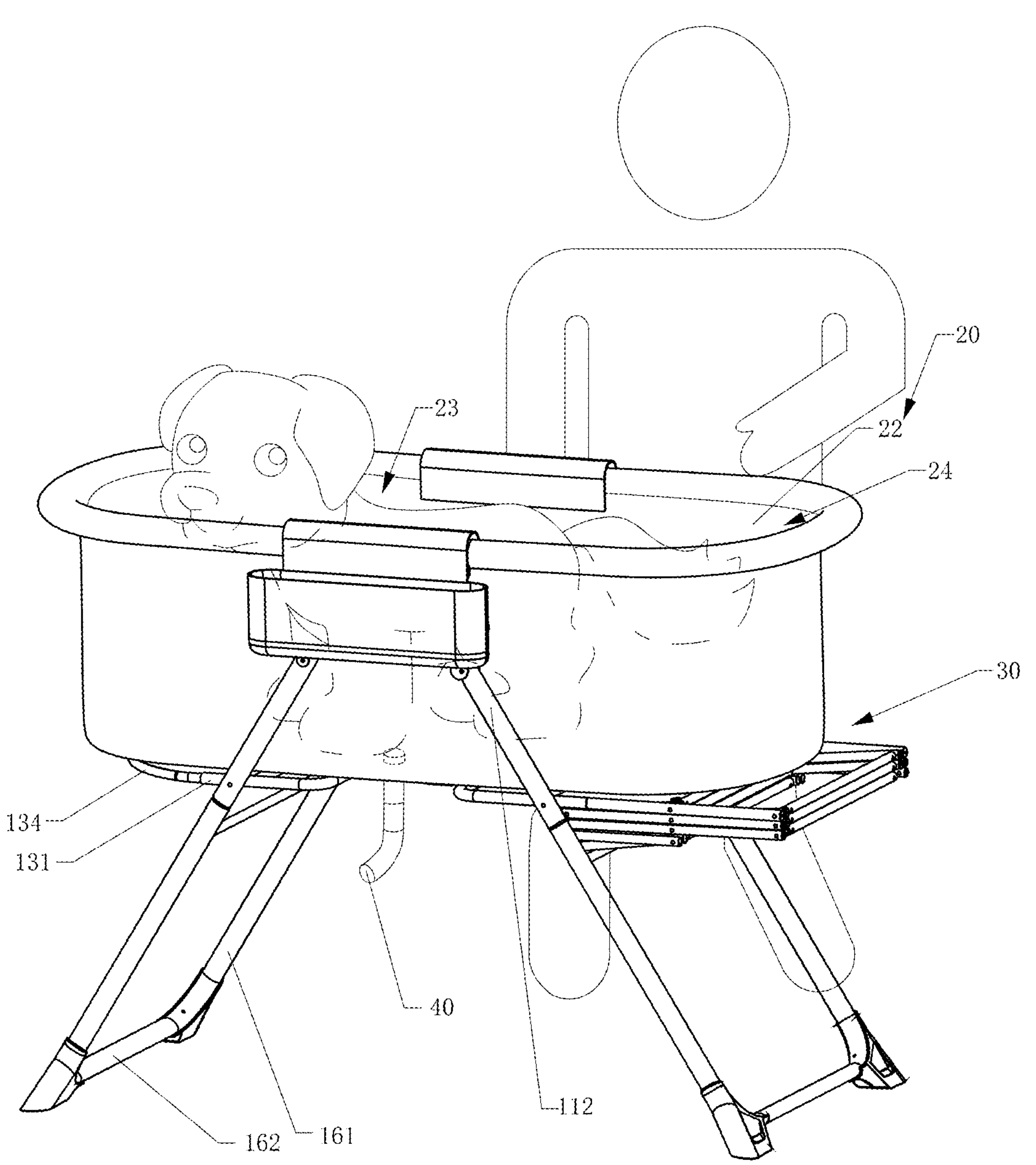

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention. The use of "comprise", "include" or "have" and variations thereof herein is intended to encompass the items listed below and their equivalents as well as additional items. Unless otherwise specified or limited, the terms "install," "connect," "support," and "couple," and variations thereof, are used broadly and encompass both direct and indirect installations, connections, supports, and couplings. Furthermore, "connect" and "couple" are not limited to physical or mechanical connections or couplings.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention. It should be understood that the term "a" should be understood as "at least one" or "one or more". In other words, in one embodiment, the number of an element may be one, and in another embodiment, the number of the element may be plural. The term "one" should not be understood as a limitation on the number.

Referring to FIG. 1 to FIG. 10E of the drawings, a bath rack according to a preferred embodiment of the present invention is illustrated, wherein the bath rack comprises a rack body 10, a bathtub 20 and a foldable ladder 30. The bathtub 20 is arranged on the rack body 10, and the bathtub 20 is supported at a preset height by the rack body 10, the foldable ladder 30 is arranged on the rack body 10. When the foldable ladder 30 is unfolded, a pet is allowed to enter and exit the bathtub 20 through the foldable ladder 30 by itself, and the user can wash the pet's body in the bathtub 20. Preferably, when the foldable ladder 30 is folded, the foldable ladder 30 can be hidden under the bathtub 20 to prevent the foldable ladder 30 from affecting the cleaning process.

M ore specifically, the rack body 10 comprises two supporting members 11, an opening frame 12 and a holding supporter 13, wherein the two supporting members 11 are arranged symmetrically, and middle portions of two opposite sides of the opening frame 12 are respectively arranged on tops of the two supporting members 11, and middle portions of two opposite sides of the holding supporter 13 are respectively arranged on the two supporting members 11, so as to support the opening frame 12 at a suitable height and supports the holding supporter 13 at a suitable height by the two supporting members 11.

The bathtub 20 includes a bathtub bottom wall 21 and a bathtub side wall 22 upwardly extended from a periphery of the bathtub bottom wall 21. The bathtub bottom wall 21 is supported by the holding supporter 13. A top edge of the bathtub side wall 22 is connected to the opening frame 12, so as to form a bathing space 23 between the tub bottom wall 21 and the bathtub side wall 22 for storing water or a cleaning liquid, and the pet can be received in the bathing space 23 so as to allow the user to wash the pet's body in the bathtub 20.

The foldable ladder 30 comprises an installation end portion 31 and a standing end portion 32 opposite to the installation end portion 31, and the installation end portion 31 of the foldable ladder 30 is mounted on the holding supporter 13. When the foldable ladder 30 is unfolded to allow the standing end portion 32 to stand and contact the ground, a position of a center of gravity of the foldable ladder 30 can be lowered, and the position of the center of gravity of the foldable ladder 30 is close to the position of the center of gravity of the rack body 10, so that the stability of the bath rack is ensured, and thus when the pet enters and exits the bathtub 20 through the foldable ladder 30 by itself, the bath rack can be prevented from tipping over and the reliability of the bath rack can be ensured.

It can be understood that by setting the middle portions of the opposite sides of the opening frame 12 on the tops of the two supporting members 11 and the middle portions of the holding supporter 13 on the opposite sides of the two supporting members 11, the two end portions of the opening frame 12 and two end portions of the holding supporter 13 are defined, and the two end portions of the bathtub 20 are also defined. That is, the end portions of the bathtub, the end portions of the opening frame 12 are correspondingly respectively aligned with the end portions of the holding supporter 13. The installation end portion 31 of the foldable ladder 30 is installed on one end portion of the holding supporter 13, so that after the foldable ladder 30 is unfolded, the pet is allowed to pass through the foldable ladder 30 to enter and exit the bathtub 20 by itself. By lowering the center of gravity of the foldable ladder 30 and allowing the center of gravity of the foldable ladder 30 to be close to the center of gravity of the rack body 10, when the pet passes through the foldable ladder 30 to enter and exit the bathtub 20 by itself, the stability of the bath rack can be ensured.

Preferably, with continued reference to FIG. 1 to FIG. 10E, a height position of at least one end portion of the bathtub 20 can be lowered, so that the pet can enter and exit the bathtub 20 through the foldable ladder 30 by itself. And after the pet enters the bathtub 20, the height position of the end portion of the bathtub 20 can be reset to allow sufficient water or cleaning liquid to be stored in the bathing space 23 of the bathtub 20.

Specifically, the bathtub side wall 22 of the bathtub 20 is flexible, and the bathtub 20 has a swinging end portion 24 which lowers or resets the height position of the swinging end portion 24 of the bathtub 20 by swinging up and down. Location. When the swinging end portion 24 of the bathtub 20 swings downward, the height position of the swinging end portion 24 of the bathtub 20 is lowered, so that the pet can enter and exit the bathtub 20 through the foldable ladder 30 by itself. When the swinging end portion 24 of the bathtub 20 swings upward, the height position of the swinging end portion 24 of the bathtub 20 is reset, so as to store sufficient water or cleaning liquid in the bathing space 23 of the bathtub 20.

M ore specifically, the opening frame 12 comprises two connecting elements 121, a shaping bracket 122 and an adjusting bracket 123, wherein the two connecting elements 121 are respectively disposed on the tops of the two supporting members 11. Each of the connecting elements 121 has a shaping bracket connecting end 1211 and an adjusting bracket connecting end 1212 opposite to the shaping bracket connecting end 1211. The shaping bracket 122 is curvedly extended and two opposite ends thereof are respectively connected to the shaping bracket connecting ends 1211 of the two connecting elements 121. The adjusting bracket 123 is curvedly extended, and two opposite ends thereof are respectively pivotally mounted on the adjusting bracket connecting end 1212 of the two connecting elements 121, so as to allow the adjusting bracket 123 to swing with respect to the two connecting elements 121. A first part of the top edge of the bathtub side wall 22 of the bathtub 20 is connected to the shaping bracket 122, and a second part thereof is connected to the adjusting bracket 123, and the end portion of the bathtub 20 corresponding to the adjusting bracket 123 is the swinging end portion 24 of the bathtub 2, wherein the swinging end portion 24 of the bathtub 20 swings along with the swinging of the adjusting bracket 123 to lower or reset the height position of the swinging end portion 24 of the bathtub 20.

When the adjusting bracket 123 drives the swinging end portion 24 of the bathtub 20 to swing downward, the side wall 22 of the bathtub is driven by the adjusting bracket 123 to deform, so as to lower the height position of the swinging end portion 24 of the bathtub 20. In this way, the pet can easily enter and exit the bathtub 20 through the foldable ladder 30. When the adjusting bracket 123 drives the swinging end portion 24 of the bathtub 20 to swing upward, the side wall 22 of the bathtub driven by the adjusting bracket 123 to deform, so as to reset the height position of the swinging end portion 24 of the bathtub 20, so that sufficient water or cleaning liquid can be stored in the bathing space 23 of the bathtub 20.

It is worth mentioning that, no matter when the adjusting bracket 123 drives the swinging end portion 24 of the bathtub 20 to swing downward to lower the height position of the swinging end portion 24 of the bathtub 20, or when the adjusting bracket 123 drives the swinging end portion 24 of the bathtub 20 to swing upward and resets the height position of the swinging end portion 24 of the bathtub 20, the bottom wall 21 of the bathtub 20 is kept flat to provide a sufficient standing space to the pet, so that the pet's comfort in the tub 20 is not affected during the adjustment of the swinging end portion 24 of the bathtub 20.

Continuing to refer to FIGS. 1 to 10E, the rack body 10 comprises at least one locking member 14, and the locking member 14 comprises a first locking arm 141 and a second locking arm 142. A first end portion 141*a* of the first locking arm 141 and a first end portion 142*a* of the second locking arm 142 are movably connected, and a second end portion 141*b* of the first locking arm 141 is pivotally mounted on the corresponding supporting member 11, a second end portion 142*b* of the second locking arm 142 is fixedly mounted on an end portion of the adjusting bracket 123 adjacent to the corresponding connecting element 121, wherein the connection between the first locking arm 141 and the second locking arm 142 can be locked or released. That is, the locking member 14 has a locked state and an active state, and the locking member 14 can be switched between the locked state and the active state. When the locking member 14 is in the locked state, the connection position between the first locking arm 141 and the second locking arm 142 is locked for supporting the adjusting bracket 123 to a horizontal state, when the locking member 14 is in the active state, the connection position between the first locking arm 141 and the second locking arm 142 is released, so as to allow the adjusting bracket 123 to drive the swinging end portion 24 of the bathtub 20 to swing downward to Lower the height position of the swing end portion 24 of the bathtub 20, or allow the adjusting bracket 123 to drive the swing end portion 24 of the bathtub 20 to swing upward to reset the height position of the swing end portion 24 of the bathtub 20.

Further, the first locking arm 141 has a sliding groove 1411, the first end portion 142*a* of the second locking arm 142 has a first locking slot 1421, the first end portion 141*a* of the first locking arm 141 and first end portion 142*a* of the second locking arm 142 is rotatably installed, and the first locking groove 1421 of the second locking arm 142 can be aligned with the sliding groove 1411 of the first locking arm 141. The locking member 14 further comprises a locking stopper element 143 which is configured to be able to slide along the sliding groove 1411 of the first locking arm 141. When the locking stopper element 143 slides along the sliding groove 1411 of the first locking arm 141 to the first locking groove 1421 of the second locking arm 142 to lock the second locking arm 142, the connection position of the first locking arm 141 and the second locking arm 142 is locked so that the locking member 14 is in the locked state. At this time, the first locking arm 141 and the second locking arm 142 are used to support the adjusting bracket 123 at the horizontal state so that the swinging end portion 24 of the bathtub 20 is maintained at a higher position. When the locking stopper element 143 slides along the sliding groove 1411 of the first locking arm 141 to get out out of the first locking groove 1421 of the second locking arm 142, the connecting position of the first locking arm 141 and the second locking arm 142 is released, so that the locking member 14 is in the active state, at this time, the adjusting bracket 123 can be driven to move with respect to the corresponding connecting element 121, so that the swinging end portion 24 of the bathtub 20 is allowed to swing up and down.

Furthermore, the locking member 14 comprises an operation element 144 which is movably sheathed on an outside of the first locking arm 141, and the locking stopper element 143 is provided on the operation element 144 to allow the operation element 144 to drive the locking stopper element 143 to slide along the sliding groove 1411 of the first locking arm 141. Specifically, the operation element 144 comprises an operation body 1441 and two extending arms 1442, and the operation element 144 has a longitudinal through hole 1443, an escape groove 1444 and a transverse through hole 1445, wherein the longitudinal through hole 1443 is formed in the operation body 1441, the two extending arms 1442 are integrally and spacedly extended from the operation body 1441, so as to form the escape groove 1444 between the two extending arms 1442, the escape groove 1444 and the longitudinal through hole 1443 communicate with each other, the transverse through hole 1445 penetrates through the two extending arms 1442, and the transverse through hole 1445 communicates with the escape groove 1444. The first locking arm 141 is movably disposed at the longitudinal through hole 1332 of the operation element 144 in a manner that the transverse through hole 1445 of the operation element 144 is aligned with the sliding groove 1411 of the first locking arm 141, so as to enable the operation element 144 to be movably sheathed on the outside of the first locking arm 141, wherein two opposite ends of the locking stopper element 143 are respectively disposed on the operation element at the transverse through hole 1445, so as to expose a middle portion of the first locking member 143 in the escape groove 1444 of the operation member 144 while is retained at the sliding groove 1411 of the first locking arm 141. The escape groove 1444 is used to avoid a blocking affect to the second locking arm 142, so as to allow the second locking arm 142 to rotate with respect to the first locking arm 141.

Specifically, when the operation element 144 is operated to drive the locking stopper element 143 to synchronously move down along the sliding groove 1411 of the first locking arm 141, the locking stopper element 143 slides out of the first locking groove 1421 of the second locking arm 142 to release the connection position between the first locking arm 141 and the second locking arm 142, so that the locking member 14 is moved into the active state. Accordingly, when the operation element 144 drives the locking stopper element 143 to synchronously move upward along the sliding groove 1411 of the second locking arm 142, the locking stopper element 143 can slide into the first locking groove 1421 of the second locking arm 142 to lock the connection position between the first locking arm 141 and the second locking arm 142, so that the locking member 14 is moved into the locked state.

Preferably, the operation element 144 comprises an operation arm 1446 integrally and outwardly extended from the operation body 1441, so as to facilitate the user to exert a force on the operation element 144 to allow the operation element 144 to move downward.

Furthermore, the locking member 14 comprises a reset element 145 comprising a first end portion which is biasing against the locking stopper element 143 and a second end portion which is biasing against the first locking arm 141. When the locking stopper element 143 slides with respect to the first locking arm 141 along the sliding groove 1411 of the first locking arm 141, the reset element 145 is compressed to accumulate an elastic force. When the external force applied on the locking stopper element 143 is removed, the reset element 145 drives the locking stopper element 143 to move with respect to the first locking member 143 along the sliding groove 1411 of the first locking arm 141, so as to restore its initial position. Preferably, the reset element 145 is a compression spring.

It is worth mentioning that the manner in which the second end portion of the reset element 145 biasing against the first locking arm 141 is not limited in the bath rack of the present invention, for example, the first locking arm 141 may be set with a latch 146, the second end portion of the reset element 145 is biasing against the first locking arm 145 by pressing against the latch 146.

Preferably, a middle portion of the second locking arm 142 is configured to allow a rotating movement, so as to improve the flexibility of the locking member 14. Specifically, the second locking arm 142 comprises a fixed part 1422 and a movable part 1423 pivotally mounted on the fixed part 142, and the fixed part 1422 is fixedly mounted on the end portion of the adjusting bracket 123, the movable part 1423 is pivotally mounted on the first locking arm 141, wherein the first locking groove 1421 is formed at an end portion of the movable portion 142.

Preferably, a side of the second locking arm 142 is formed with a second locking groove 1424 that can be aligned with the sliding groove 1411 of the first locking arm 141. After the movable part 1423 rotates with respect to the first locking arm 141, the locking stopper element 143 can slide to a position corresponding to the second locking groove 1424 of the second locking arm 142 to allow the swinging end portion 24 of the bathtub 20 to be held in a lowered position.

Preferably, the first end portion 141*a* of the first locking arm 141 has a blocking block 1412 protruded from a side surface of the first locking arm 141 for blocking the the movement of the movable part 1423 of the second locking arm 142, so as to restrict the rotation direction of the second locking arm 142. For example, the first locking arm 141 is a sheet metal part, which forms the blocking block 1412 by bending.

Preferably, the first locking arm 141 comprises a reinforcing rib 1413 extended along a length direction of the first locking arm 141 for enhancing the strength of the first locking arm 141. For example, the first locking arm 141 is a sheet metal part, and the reinforcing rib 1413 is formed by punching.

In this specific example of the bath rack shown in FIG. 1 to FIG. 10E, the number of the locking members 14 is two, and one locking member 14 is provided tween one supporting member 121 and an end portion of the adjusting bracket 123, the other locking member 14 is provided between the other supporting member 11 and the other end portion of the adjusting bracket 123, so that the two locking members 14 can stably support the adjusting bracket 123 to keep the adjusting bracket 123 be horizontal.

Optionally, in other examples of the bath rack of the present invention, the first end portion of the first locking arm 141 can be pivotally mounted on the adjusting bracket 123, and the fixed part of the second locking arm 142 can be fixedly mounted on the corresponding supporting member 11, so that when the locking member 14 is in the locked state, the first locking arm 141 and the second locking arm 142 can support the adjusting bracket 123 at a horizontal state, and when the locking member 14 is in the active state, the first locking arm 141 and the second locking arm 142 can rotate with respect to each other to allow the adjusting bracket 123 to drive the swinging end portion 24 of the bathtub 20 to swing up and down.

Continuing to refer to FIGS. 1 to 10E, in this preferred example of the bath rack of the present invention, the rack body 10 is foldable to reduce a size of the bath rack when it is not in use.

Specifically, each of the supporting member 11 comprises a first supporting leg 111 and a second supporting leg 112, and top end portions of the first supporting legs 111 and the second supporting legs 112 are pivotally installed with each other to form the top of the corresponding supporting member 11. The holding supporter 13 comprises a first holding bracket 131, a second holding bracket 132 and a pivot mechanism 133, wherein the first holding bracket 131 has a first inner end portion 1311 and a first outer end portion 1312 opposite to the first inner end portion 1311, the first inner end portion 1311 of the first holding bracket 131 is fixedly mounted on the pivot mechanism 133, two opposite lateral sides of the first holding bracket are respectively rotatably mounted on the first supporting legs 111 of the two supporting members 11. The second holding bracket 132 has a second inner end portion 1321 and a second outer end portion 1322 opposite to the second inner end portion 1321, the second inner end portion 1321 of the second holding bracket 132 is pivotally mounted on the pivot mechanism 133, two opposite lateral sides of the second holding bracket 132 are respectively rotatably mounted on the second supporting legs 112 of the two supporting members 11.

The first supporting legs 111 and the second supporting leg 112 of the two supporting members 11, the first holding bracket 131 and the second holding bracket 132 of the holding supporter 13, and the pivot mechanism 133 can be linked to operate together.

When the first supporting legs 111 and the second supporting legs 112 of the two supporting members 11 are moved in such a way that bottom ends of the first supporting legs 111 and the second supporting legs 112 are moved away from each other, on one hand, the first holding bracket 131 rotates with respect to the first supporting legs 111, the second holding bracket 132 rotates with respect to the second supporting legs 112; and on the other hand, the first holding bracket 131 and the second holding bracket 132 are rotated with respect to each other, so that the first holding bracket 131 and the second holding bracket 132 tend to be horizontal. When the first holding bracket 131 and the second holding bracket 132 are horizontal, the rack body 10 is unfolded and is in an unfolded state.

When the first supporting legs 111 and the second supporting legs 112 of the two supporting members 11 are moved in such a way that the bottom ends of the first supporting legs 111 and the second supporting legs 112 are moved toward to each other, on one hand, the first holding bracket 131 rotates with respect to the first supporting leg 111, the second holding bracket 132 rotates with respect to the second supporting legs 112, and one the other hand, the first holding bracket 131 and the second holding bracket 132 are rotated with respect to each other, so that the first holding bracket 131 and the second holding bracket 132 tend to be overlapped with each other. When the first holding bracket 131 and the second holding bracket 132 are stacked, the rack body 10 is folded to be in a folded state.

Preferably, when the first holding bracket 131 and the second holding bracket 132 are horizontal, the pivot mechanism 133 can lock the first holding bracket 131 and the second holding bracket 132, so as to ensure that the rack body 10 is reliably retained in the unfolded state.

Specifically, the pivot mechanism 133 comprises a pivot element 1331 and a locking element 1332, wherein the pivot element 1331 has a pivot space 13311 and two limiting grooves 13312 which are respectively communicated with the pivot space 13311 at two opposite sides of the pivot element 1331, wherein two opposite end portions of the locking element 1332 are respectively slidably installed in the two limiting grooves 13312 of the pivot element 1331, so that a middle of the locking element 1332 is located in the pivot space 13311 of the pivot element 1331. The first inner end portion 1311 of the first holding bracket 131 is fixedly mounted on one end portion of the pivot element 1331, and the second inner end portion 1321 of the second holding bracket 132 is rotatably mounted on the other end portion of the pivot element 1331, and the second holding bracket 132 forms a retaining groove 1323 at the second inner end portion 1321, and the retaining groove 1323 can be in the pivot space 13311 of the element 1331 to be aligned with the limiting grooves 13312, so as to allow the middle of the locking element 1332 to be held in the retaining groove 1323 of the second holding bracket 132. When the locking element 1332 slides along the limiting grooves 13312 of the pivot element 1331 to the retaining groove 1323 of the second holding bracket 132, the pivot mechanism 133 locks the first holding bracket 131 and the second holding bracket 132 which are made horizontal to ensure that the rack body 10 is retained reliably in the unfolded state. When the locking element 1332 slides along the limiting grooves 13312 of the pivot element 1331 and get out of the retaining groove 1323 of the second holding bracket 132, the pivot mechanism 133 releases the first holding bracket 131 and the second holding bracket 132 which can be rotated with respect to each other, so that the rack body 10 can be folded.

Furthermore, the pivot element 1331 has a top through hole 13313 which is communicated with the pivot space 13311, wherein the pivoting mechanism 133 further comprises a pulling element 1333 and a restoring element 1334, one end portion of the pulling element 1333 is mounted on the locking element 1332 after extending into the pivot space 13311 through the top through hole 13313 of the pivot element 1331, and the restoring element 1334 is held between the pivot element 1331 and the locking element 1332.

When a force is applied to the locking element 1332 through the pulling element 1333, the locking element 1332 can move upward along the limiting grooves 13312 of the pivot element 1331 to allow the locking element 1332 to slide out of the retaining groove 1323 of the second holding bracket 132, so that the pivot mechanism 133 releases the first holding bracket 131 and the second holding bracket 132, and at this time, the restoring element 1334 is pressed and deformed by the pivot element 1331 and the locking element 1332 to accumulate an elastic force. When the pulling element 1333 continues to exert the force on the locking element 1332, based on the principle of gravity, the first holding bracket 131 and the second holding bracket 132 can automatically rotate with respect to each other to allow the rack body 10 to automatically switches from the unfolded state to the folded state.

When the external force applied to the pulling element 1333 is removed, the restoring element 1334 drives the pulling element 1333 to move downward along the limiting grooves 13312 of the pivot element 1331 during the process of restoring its initial state, so as to allow the locking member 1332 to slide to the locking groove 1323 of the second holding bracket 132, so that the pivot mechanism 133 locks the first holding bracket 131 and the second holding bracket 132.

Continuing to refer to FIGS. 1 to 10E, opposite end portions of the shaping bracket 122 can be respectively rotatably mounted on the shaping bracket connecting ends 1211 of the two connecting elements 121, wherein the rack body 10 further comprises at least one bracing member 15, the bracing member 15 comprises a first bracing element 151 and a second bracing element 152, one end portion of the first bracing element 151 and one end portion of the second bracing element 152 are pivotally mounted, the other end portion of the first bracing element 151 is pivotally mounted on the corresponding first supporting leg 111 of the supporting member 11, and the other end portion of the second bracing element 152 is fixedly mounted to the end portion of the shaping bracket 122.

In a preferred example of the shower rack of the present invention, a length of the first bracing element 151 is greater than a length of the second bracing element 152, so that the first bracing element 151 and the second bracing elements 152 can cooperate with each other to reliably support the shaping bracket 122 at the horizontal state. Specifically, when the first bracing element 151 is exerted with a force, the opposite end portions of the first bracing element 151 are allowed to rotate with respect to the corresponding first supporting leg 111 and the second bracing element 152 respectively, the shaping bracket 122 can be rotated toward the direction close to the corresponding first supporting leg 111, so that the shaping bracket 122 can be stacked on the corresponding first supporting leg 111. When the shaping bracket 122 is forced to rotate in a direction away from the corresponding first supporting leg 111, the shaping bracket 122 can drive the first bracing element 151 to allow the opposite end portions of the first bracing element 151 to rotate with respect to the corresponding first supporting leg 111 and the second bracing element 152, and when the shaping bracket 122 is rotated to the horizontal state, the first bracing element 151 and the second bracing element 152 can cooperate with each other to reliably support the shaping bracket 122.

In this specific example of the bath rack shown in FIG. 1 to FIG. 10E, the number of the bracing members 15 is two, and one of the bracing members 15 is provided between the first supporting leg 111 of one supporting member 11 and one end portion of the shaping bracket 122, the other bracing member 15 is provided between the first supporting leg 111 of the other supporting member 11 and the other end portion of the shaping bracket 122, and thus the two bracing members 15 can stably support the shaping brackets 122 and keep the shaping bracket 122 be horizontal.

Continuing to refer to FIGS. 1 to 10E, the second end portion 141*a* of the first locking arm 141 of the locking member 14 is rotatably mounted to the corresponding second supporting leg 112 of the supporting member 11. In other words, opposite end portions of the locking member 14 are respectively connected to the second supporting leg 112 of the supporting member 11 and the end portion of the adjusting bracket 123 to allow the locking member 14 to support the adjusting bracket 123 at the horizontal state.

Continuing to refer to FIG. 1 to FIG. 10E, the bathtub 20 is flexible, and the shape of the bathtub 20 can change itself as the shape of the rack body 10 changes. For example, the bathtub 20 automatically folds along with the folding of the rack body 10, and the bathtub 20 is automatically unfolded along with the unfolding of the rack body 10.

Specifically, the bathtub bottom wall 21 of the bathtub 20 is installed on the support supporter 13 of the rack body 10, and the top edge of the bathtub side wall 22 is connected to the opening bracket 12 of the rack body 10. When the shaping bracket 122 of the opening bracket 12 is rotated toward the direction close to the first support legs 111 of the supporting members 11, the shaping bracket 122 can drive the bathtub side wall 22 of the bathtub 20 to deform to lower the height position of one end portion of the bathtub 20; when the adjusting bracket 123 of the opening bracket 12 is rotated toward the direction close to the second supporting legs 112 of the supporting members 11, the adjusting bracket 123 can drive the bathtub side wall 22 of the bathtub 20 to deform to lower the height position of the swinging end portion 24 of the bathtub 20; when the first holding bracket 131 and the second holding bracket 132 are relatively rotated with respect to each other and tend to be stacked, the first holding bracket 131 and the second holding bracket 132 drive the bathtub bottom wall 21 of the bathtub 20 to deform to allow the two sides of the bathtub bottom wall 21 to deform, so as to allow two end portion thereof to move close to each other and tend to overlap with each other, so that the bath rack can be folded to reduce the size of the bath rack when not in use.

Correspondingly, when the first holding bracket 131 and the second holding bracket 132 are rotated with respect to each other and tend to be horizontal, the first holding bracket 131 and the second holding bracket 132 drive the bathtub bottom wall 21 of the bathtub 20 to deform, so as to allow the two end portions of the bathtub bottom wall 21 to move away from each other and tend to be horizontal; when the shaping bracket 122 of the opening frame rotate along a direction away from the first supporting leg 111 of the supporting members 11, the shaping bracket 122 can drive the bathtub side wall 22 of the bathtub 20 to deform to reset the height position of the corresponding end portion of the bathtub 20; when the adjusting bracket 123 of the opening frame 12 is rotated in a direction away from the second supporting legs 112 of the supporting members 11, the adjusting bracket 123 can drive the bathtub side wall 22 of the bathtub 20 to deform to reset the height position of the swing end portion 24 of the 20 so that the bath rack can be unfolded to allow the bathtub 20 to form the bathing space 23.

Preferably, a middle part of the bathtub bottom wall 21 of the bathtub 20 comprises a force bearing part 211, wherein the pulling element 1333 of the holding supporter 13 is connected to the bathtub bottom wall 21, when an upward force is applied and exerted on the force bearing portion 211 of the bathtub bottom wall 21, the bathtub bottom wall 21 transmits a pulling force to the pulling element 1333 of the holding supporter 13, so as to allow the pulling element 1333 to pull upward the locking element 1332, so as to slide the locking element 1332 out of the retaining groove 1323 of the second holding bracket 13.

Continuing to refer to FIGS. 1 to 10E, the rack body 10 further comprises two extending legs 16, each of the extending legs 16 respectively comprises two longitudinally extending legs 161 and at least one transversely extending leg 162. The opposite ends of the transversely extending leg 162 are respectively connected to the two longitudinally extending legs 161, wherein the two longitudinally extending legs 161 of one of the extending legs 16 are respectively detachably mounted on bottom end portions of the first supporting legs 111 of the two supporting members 11, the two longitudinally extending legs 161 of the other extending leg 16 are respectively detachably mounted on bottom end portions of the second supporting legs 112 of the two supporting members 11, so that the two extending legs 16 can not only increase the height at which the bathtub 20 is supported, but also improve the stability of the rack body 10.

Continuing to refer to FIGS. 1 to 10E, the holding supporter 13 further comprises an auxiliary frame 134 mounted on the first outer end portion 1312 of the first holding bracket 131 for increasing an area of the holding supporter 13, so that the holding supporter 13 can reliably support the bathtub bottom wall 21 of the bathtub 20. Preferably, the auxiliary frame 134 is detachably mounted on the first outer end portion 1312 of the first holding bracket 131.

Continuing to refer to FIG. 1 to FIG. 10E, the bath rack further comprises a water outlet pipe 40 connected to the bathtub bottom wall 21 of the bathtub 20 to allow water or cleaning liquid in the cleaning space 23 to be discharged through the water outlet pipe 40.

Continuing to refer to FIGS. 1 to 10E, an assembly end portion 31 of the foldable ladder 30 is mounted on the second outer end portion 1322 of the second holding bracket 132. In this specific example of the bath rack of the present invention, the foldable ladder 30 can support the bathtub bottom wall 21 of the bathtub 20, that is, the foldable ladder 30 and the holding supporter 13 can reliably cooperate to support the bathtub bottom wall 21 of the bathtub 20.

Specifically, the foldable ladder 30 comprises a pair of first horizontal bars 301, a pair of second horizontal bars 302, a pair of third horizontal bars 303, a pair of fourth horizontal bars 304, a pair of first longitudinal bars 305, a pair of second longitudinal bars 306, a pair of third longitudinal bars 307, a pair of fourth longitudinal bars 308 and a series of connecting rods 309. The pair of the first horizontal bars 301, the pair of the second horizontal bars 302, the pair of the third horizontal bars 303 and the pair of the fourth horizontal bars 304 have height differences. End portions of the first horizontal bars 301 are respectively mounted on the second outer end portion 1323 of the second holding bracket 132 to allow the pair of the first horizontal bars 301 to cooperate with the second holding bracket 132 to reliably support the bathtub bottom wall 21 of the bathtub 20. Tops of the pair of first longitudinal bars 305 are respectively pivotally connected to middles of the pair of first horizontal bars 301, and bottoms thereof are respectively pivotally connected to end portions of the pair of the second horizontal bars 302. Tops of the second longitudinal bars 306 are respectively pivotally connected to end portions of the first horizontal bars 301, and middles thereof are rotatably connected to middles of the pair of second horizontal bars 302, bottoms are respectively pivotally connected to end portions of the pair of third horizontal bars 303. Tops of the pair of third longitudinal bars 307 are respectively pivotally connected to end portions of the pair of second horizontal bars 302, middles thereof are respectively rotatably connected to the middles of the pair of third horizontal bars 303, and bottoms are respectively pivotally connected to the pair of fourth horizontal bars 304. Tops of the pair of fourth longitudinal bars 308 are respectively connected to end portions of the pair of third horizontal bars 303, and bottoms thereof are respectively connected to the pair of the fourth longitudinal bars 303. Tops of the pair of the first longitudinal bars 305, the pair of the second longitudinal bars 306, the pair of third longitudinal bars 307 and the pair of the fourth longitudinal bars 308 are respectively connected with one connecting bar 309, and the middles of the pair of the second longitudinal bars 306 and the middles of the pair of the third longitudinal bars 307 are respectively connected with one connecting bar 309.

When the foldable ladder 30 is unfolded, the pair of the first horizontal bars 301, the pair of the second horizontal bars 302, the pair of the third horizontal bars 303 and the pair of the fourth horizontal bars 304 are parallel to each other, the pair of the first longitudinal bars 305, the pair of the second longitudinal bars 306, the pair of the third longitudinal bars 307 and the pair of the fourth longitudinal bars 308 are parallel to each other, so the foldable ladder 30 form a plurality of step surfaces 33 for the pet to enter and exit the bathtub 20 at a high position through the step surfaces 33 of the foldable ladder 30 by itself. When the foldable ladder 30 is folded, the pair of the first horizontal bars 301, the pair of the second horizontal bars 302, the pair of the third horizontal bars 303 and the pair of the fourth horizontal bars 304 are stacked on each other, the pair of the first longitudinal bars 305, the pair of the second longitudinal bars 306, the pair of the third longitudinal bars 307 and the pair of the fourth longitudinal bars 308 are stacked on each other to hide the foldable ladder 30 under the bathtub 20 to prevent the foldable ladder 30 from affecting the bathing process.

Further, the foldable ladder 30 comprises a flexible bearing surface 310 which is connected in sequence with the pair of the first horizontal bars 301, the pair of the second longitudinal bars 306, the pair of the second horizontal bars 302, the pair of the third longitudinal bars 307 and the pair of the third horizontal bars 303, and a shape of the bearing surface 310 changes with the changed configuration of the foldable ladder 30, wherein when the foldable ladder 30 is unfolded, the bearing surface 310 is unfolded synchronously to cover the step surfaces 33, so that when the pets passes through the step surfaces 33 of the foldable ladder 30 to enter and exit the bathtub 20 at an elevated position, the bearing surface can prevent the pet from falling from a hollowed out position of the foldable ladder 30. When the foldable ladder 30 is folded, the bearing surface 310 can be sandwiched between the pair of the second longitudinal bars 306 and the pair of the second horizontal bars 302, and sandwiched between the pair of the third longitudinal bars 307 and the pair of the third horizontal bars 303.

FIGS. 9A to 9D show the unfolding process of the rack body 10. When the bottoms of the first supporting legs 111 and the bottoms of the second supporting leg 112 are separated by relative rotation of the first supporting legs 111 and the second supporting legs 112, on one hand, the first supporting legs 111 drive the first holding bracket 131 to rotate, and the second supporting legs 112 drive the second holding bracket 132 to rotate. The two holding brackets 132 are rotated relative to each other so that the first holding bracket 131 and the second holding bracket 132 tend to be horizontal. When the first holding bracket 131 and the second holding bracket 132 are rotated to be in a horizontal state, the locking element 1332 of the pivot mechanism 133 slides along the limiting groove 13312 of the pivot element 1331 to the retaining groove 1323 of the second holding bracket 132 to lock the first holding bracket 131 with the second holding bracket 132. When the shaping bracket 122 is pulled away from the first supporting legs 11, the opposite end portions of each of the first bracing elements 151 of the bracing members 15 are respectively rotate with respect to the corresponding first supporting leg 111 and the second bracing element 152, and when the shaping bracket 122 is rotated to be in the horizontal state, the first bracing element 151 and the second bracing element 152 cooperate with each other to support shaping bracket 122 which is held in the horizontal state. When the adjusting bracket 123 is pulled away from the second supporting legs 112, the opposite end portions 141*a* and 141*b* of each first locking arm 141 are respectively rotated with respect to the corresponding second supporting leg 112 and the second locking arm 142, and when the first locking groove 1421 of the second locking arm 142 is aligned with the sliding groove 1411 of the first locking arm 141, the locking element 143 slides to the first locking groove 1421 of the second locking arm 142, so as to lock up the connection between the first locking arm 141 and the second locking arm 142, so that the first locking arm 141 and the second locking arms 142 cooperate with each other to support the adjusting bracket 123 to be kept in a horizontal state.

In addition, the folding process of the frame body 10 is illustrated in the following description. The locking element 1332 is pulled upward by the pulling element 1333 to allow the locking element 1332 to slide out of the retaining groove 1323 of the second holding bracket 132, continuing to pull the locking element 1332 upward through the pulling element 1333 to allow the locking element 1332 to drive the pivot element 1331 to move upward, and due to the principle of gravity, the first holding bracket 131 and the second holding bracket 132 can automatically rotate with respect to each other. At this time, on one hand, the first holding bracket 131 drives the first supporting leg 111 to rotate, and the second holding bracket 132 drives the second supporting legs 112 to rotate; on the other hand, the first supporting legs 111 and the corresponding second supporting legs 112 are rotated with respect to each other respectively, so that the first holding bracket 131 and the second holding bracket 132 tend to overlap and the supporting legs 111 and the corresponding second supporting legs 112 tend to overlap. And subsequently, the first holding bracket 131 and the second holding bracket 132 can be stacked, and the first supporting legs 111 and the corresponding second supporting legs 112 can be respectively stacked. When each first bracing element 151 is subjected to a force to allow the opposite end portions thereof to rotate with respect to the corresponding first supporting leg 111 and the second bracing element 152 respectively, the shaping bracket 122 can move toward the direction close to the first supporting legs 111, and the shaping bracket 122 can be stacked on the first supporting legs 111. When each locking element 143 slides out of the first locking groove 1421 of the second locking arm 142, the two opposite end portions 141*a* and 142*a* of the first locking arm 141 can be respectively rotated with respect to the corresponding second supporting leg 112 and the second locking arm 142 to allow the adjusting bracket 123 to move toward the direction close to the second supporting legs 112, and the adjusting bracket 123 can be stacked on the second supporting legs 112.

FIGS. 10A-10E illustrate a process for bathing a pet using the bath rack. When the user applies a force to the operating arm 1446 of the operation member 144 of each locking member 14 to allow the operation member 144 to slide down along the first locking arm 141, the operation member 144 drives the locking element 143 to slide out of the first locking groove 1421 of the second locking arm 142. When the two opposite end portions of each first locking element 141 are respectively rotated with respect to the corresponding second supporting leg 112 and the second locking arm 142, and the movable part 1423 of the second locking arm 142 is rotated with respect to the fixed part 1422, the adjusting bracket 123 swings downward to lower the height position of the swinging end portion 24 of the bathtub 20. Preferably, when the second locking groove 1424 of the second locking arm 142 is aligned with the sliding groove 1411 of the first locking arm 141, the locking element 143 can slide to the second locking groove 1424 of the second locking arm 142, so as to allow the swinging end portion 24 of the tub 20 to be held in a lower position. At this time, the pet can easily enter the bathing space 23 of the bathtub 20 through the foldable ladder 30 at the swinging end portion 24 of the bathtub 20 by itself. After the pet enters the bathing space 23 of the bathtub 20, the adjusting bracket 123 can be forced to swing upward, and the upward movement of the adjusting bracket 123 can drive the movable part 1423 of the second locking arm 142 to rotate with respect to the fixed part 1422 and drives the first locking arm 141 to rotate with respect to the corresponding second supporting leg 112 and the second locking arm 142. When the first locking groove 1421 of the second locking arm 142 of each locking member 14 is aligned with the sliding groove 1411 of the first locking arm 141, the locking element 143 can slide to the first locking groove 1421 of the second locking arm 142, so as to allow the locking element 143 to lock the connection position between the first locking arm 141 and the second locking arm 142, so that the first locking arm 141 and the second locking arm 142 reliably support the adjusting bracket 123 in a horizontal state, and the foldable ladder 30 being folded can be hidden under the bathtub 20 to avoid affecting the cleaning process.

Referring to FIG. 11 to FIG. 18 of the drawings, a bath rack according to an alternative state of the above preferred embodiment of the present invention is illustrated, wherein the bath rack comprises a rack body 10, a bathtub 20 and a foldable ladder 30. The bathtub 20 is arranged on the rack body 10, and the bathtub 20 is supported at a preset height by the rack body 10, the foldable ladder 30 is arranged on the rack body 10. When the foldable ladder 30 is unfolded, a pet is allowed to enter and exit the bathtub 20 through the foldable ladder 30 by itself, and the user can wash the pet's body in the bathtub 20. Preferably, when the foldable ladder 30 is folded, the foldable ladder 30 can be hidden under the bathtub 20 to prevent the foldable ladder 30 from affecting the cleaning process.

Similar to the above preferred embodiment, the rack body 10 comprises two supporting members 11, an opening frame 12 and a holding supporter 13, wherein the two supporting members 11 are arranged symmetrically, and middle portions of two opposite sides of the opening frame 12 are respectively arranged on tops of the two supporting members 11, and middle portions of two opposite sides of the holding supporter 13 are respectively arranged on the two supporting members 11, so as to support the opening frame 12 at a suitable height and supports the holding supporter 13 at a suitable height by the two supporting members 11.

The bathtub 20 comprises a bathtub bottom wall 21 and a bathtub side wall 22 upwardly extended from a periphery of the bathtub bottom wall 21. The bathtub bottom wall 21 is supported by the holding supporter 13. A top edge of the bathtub side wall 22 is connected to the opening frame 12, so as to form a bathing space 23 between the tub bottom wall 21 and the bathtub side wall 22 for storing water or a cleaning liquid, and the pet can be received in the bathing space 23 so as to allow the user to wash the pet's body in the bathtub 20.

The foldable ladder 30 comprises an installation end portion 31 and a standing end portion 32 opposite to the installation end portion 31, and the installation end portion 31 of the foldable ladder 30 is mounted to the rack body 10. When the foldable ladder 30 is unfolded to allow the standing end portion 32 to stand and contact the ground, a position of a center of gravity of the foldable ladder 30 can be lowered, and the position of the center of gravity of the foldable ladder 30 is close to the position of the center of gravity of the rack body 10, so that the stability of the bath rack is ensured, and thus when the pet enters and exits the bathtub 20 through the foldable ladder 30 by itself, the bath rack can be prevented from tipping over and the reliability of the bath rack can be ensured.

Each of the supporting member 11 comprises a first supporting leg 111 and a second supporting leg 112, and top end portions of the first supporting legs 111 and the second supporting legs 112 are pivotally installed with each other to form the top of the corresponding supporting member 11. In this embodiment, the foldable ladder 30 comprises a mounting rod 34 mounted to the two supporting members 11. M ore specifically, two ends 341 of the mounting rod 34 is rotatably mounted to two second supporting legs 112, so that the foldable ladder 30 is pivotally mounted to the rack body 10.

The installation end portion 31 of the foldable ladder 30 comprises two installation arms 311 mounted to the mounting rod 34. Accordingly, the two installation arms 311 are parallelly and spacedly mounted at two sides of the mounting rod 34, so that the foldable ladder 30 can be pivotally moved when the mounting rod 34 is rotated. Alternatively, the foldable ladder 30 is not provided with the mounting rod 34, and the two installation arms 311 may be directly pivotally mounted to the two second supporting legs 112.

Similar to the above preferred embodiment, the foldable ladder 30 comprises a pair of first horizontal bars 301, a pair of second horizontal bars 302, a pair of third horizontal bars 303, a pair of fourth horizontal bars 304, a pair of first longitudinal bars 305, a pair of second longitudinal bars 306, a pair of third longitudinal bars 307, a pair of fourth longitudinal bars 308 and a series of connecting rods 309. The pair of the first horizontal bars 301, the pair of the second horizontal bars 302, the pair of the third horizontal bars 303 and the pair of the fourth horizontal bars 304 have height differences. End portions of the first horizontal bars 301 are respectively transversely extended from the two installation arms 311, so as to move along with the installation arms 311 and the mounting rod 34.

Tops of the pair of first longitudinal bars 305 are respectively pivotally connected to middles of the pair of first horizontal bars 301, and bottoms thereof are respectively pivotally connected to end portions of the pair of the second horizontal bars 302. Tops of the second longitudinal bars 306 are respectively pivotally connected to end portions of the first horizontal bars 301, and middles thereof are rotatably connected to middles of the pair of second horizontal bars 302, bottoms are respectively pivotally connected to end portions of the pair of third horizontal bars 303. Tops of the pair of third longitudinal bars 307 are respectively pivotally connected to end portions of the pair of second horizontal bars 302, middles thereof are respectively rotatably connected to the middles of the pair of third horizontal bars 303, and bottoms are respectively pivotally connected to the pair of fourth horizontal bars 304. Tops of the pair of fourth longitudinal bars 308 are respectively connected to end portions of the pair of third horizontal bars 303, and bottoms thereof are respectively connected to the pair of the fourth longitudinal bars 303. Tops of the pair of the first longitudinal bars 305, the pair of the second longitudinal bars 306, the pair of third longitudinal bars 307 and the pair of the fourth longitudinal bars 308 are respectively connected with one connecting bar 309, and the middles of the pair of the second longitudinal bars 306 and the middles of the pair of the third longitudinal bars 307 are respectively connected with one connecting bar 309.

When the foldable ladder 30 is unfolded, the pair of the first horizontal bars 301, the pair of the second horizontal bars 302, the pair of the third horizontal bars 303 and the pair of the fourth horizontal bars 304 are parallel to each other, the pair of the first longitudinal bars 305, the pair of the second longitudinal bars 306, the pair of the third longitudinal bars 307 and the pair of the fourth longitudinal bars 308 are parallel to each other, so the foldable ladder 30 form a plurality of step surfaces 33 for the pet to enter and exit the bathtub 20 at a high position through the step surfaces 33 of the foldable ladder 30 by itself. When the foldable ladder 30 is folded, the pair of the first horizontal bars 301, the pair of the second horizontal bars 302, the pair of the third horizontal bars 303 and the pair of the fourth horizontal bars 304 are stacked on each other, the pair of the first longitudinal bars 305, the pair of the second longitudinal bars 306, the pair of the third longitudinal bars 307 and the pair of the fourth longitudinal bars 308 are stacked on each other to hide the foldable ladder 30 under the bathtub 20 to prevent the foldable ladder 30 from affecting the bathing process. In this embodiment, the second horizontal bars 302 and third horizontal bars 303 may have a same length, and the length of each of the fourth horizontal bars 304 is half of the length of the second horizontal bars 302 and third horizontal bars 303. The length of the first longitudinal bars 305 and the fourth longitudinal bars 308 can be half of the length of the second longitudinal bars 306 and third longitudinal bars 307.

In this embodiment, the mounting rod 34 is provided under the holding supporter 13, and the first holding bracket 131 and the second holding bracket 132 can be symmetrical with each other, such as a U-shaped frame, and they are not required for mounting the foldable ladder 30. The foldable ladder 30 is thus mounted under the holding supporter 13.

The foldable ladder 30 comprises a flexible bearing surface 310 which is connected in sequence with the pair of the first horizontal bars 301, the pair of the second longitudinal bars 306, the pair of the second horizontal bars 302, the pair of the third longitudinal bars 307 and the pair of the third horizontal bars 303, and a shape of the bearing surface 310 changes with the changed configuration of the foldable ladder 30, wherein when the foldable ladder 30 is unfolded, the flexible bearing surface 310 is covered on the step surfaces 33 for supporting the pet.

According to this preferred embodiment, when the foldable ladder 30 is in the unfolded state, the mounting rod 34 is rotated upward, the two installation arms 311 are moved along with the mounting rod 34 to a state that the two installation arms 31 are vertically extending along a height direction, so as to direct the top horizontal bars that are the first horizontal bars 301 to be moved to a state that the first horizontal bars 301 are extending along a horizontal direction. And then the pair of the second horizontal bars 302, the pair of the third horizontal bars 303 and the pair of the fourth horizontal bars 304 are also moved to the unfolded state in which they are extending along the horizontal direction, and the pair of the first longitudinal bars 305, the pair of the second longitudinal bars 306, the pair of the third longitudinal bars 307 and the pair of the fourth longitudinal bars 308 are moved to the unfolded state in which they are extending along a vertical and longitudinal direction, so that two adjacent horizontal bars and two adjacent longitudinal bars form a rectangular frame 300 that can stably support the pet on the step surfaces 33.

According to this preferred embodiment, the two installation arms 311 are vertically connected to the mounting rod 34, the first horizontal bars 301 are transversely connected to the two installation arms 311, the two installation arms 311 and the first horizontal bars 301 are driven to move when the mounting rod 34 is rotated. In an alternative mode, the mounting rod 34 may be fixed to the pair of second supporting legs 112 while the two installation arms 311 are rotatably coupled to the mounting rod 34, so as to direct the movement of the first horizontal bars 301, so that the foldable ladder 30 can be moved to the unfolded state.

Preferably, each of the two installation arms 311 is provided with a mounting sleeve 312 at each end thereof, so as to mount each installation arm 311 with the mounting rod 34 or the first horizontal bar 301.

The foldable ladder 30 further comprises a bracing arm 35 comprising a pivot end 351 that is pivotally connected to a middle of the bottom horizontal bar that is the fourth horizontal bar 304, and a biasing end 352 at an opposite side of the pivot end 351. The foldable ladder 30 further comprises a stopper arm 36 which is transversely extended from a lateral side of the bottom longitudinal bar that is the fourth longitudinal bar 308. The biasing end 352 of the bracing arm 35 is biasing against the stopper arm 36, so as to retain the position of the fourth horizontal bar 304 and the fourth longitudinal bar 308, so that the structural strength of the frame formed by all of the horizontal bars and the longitudinal bars can be enhanced.

Figure 11:
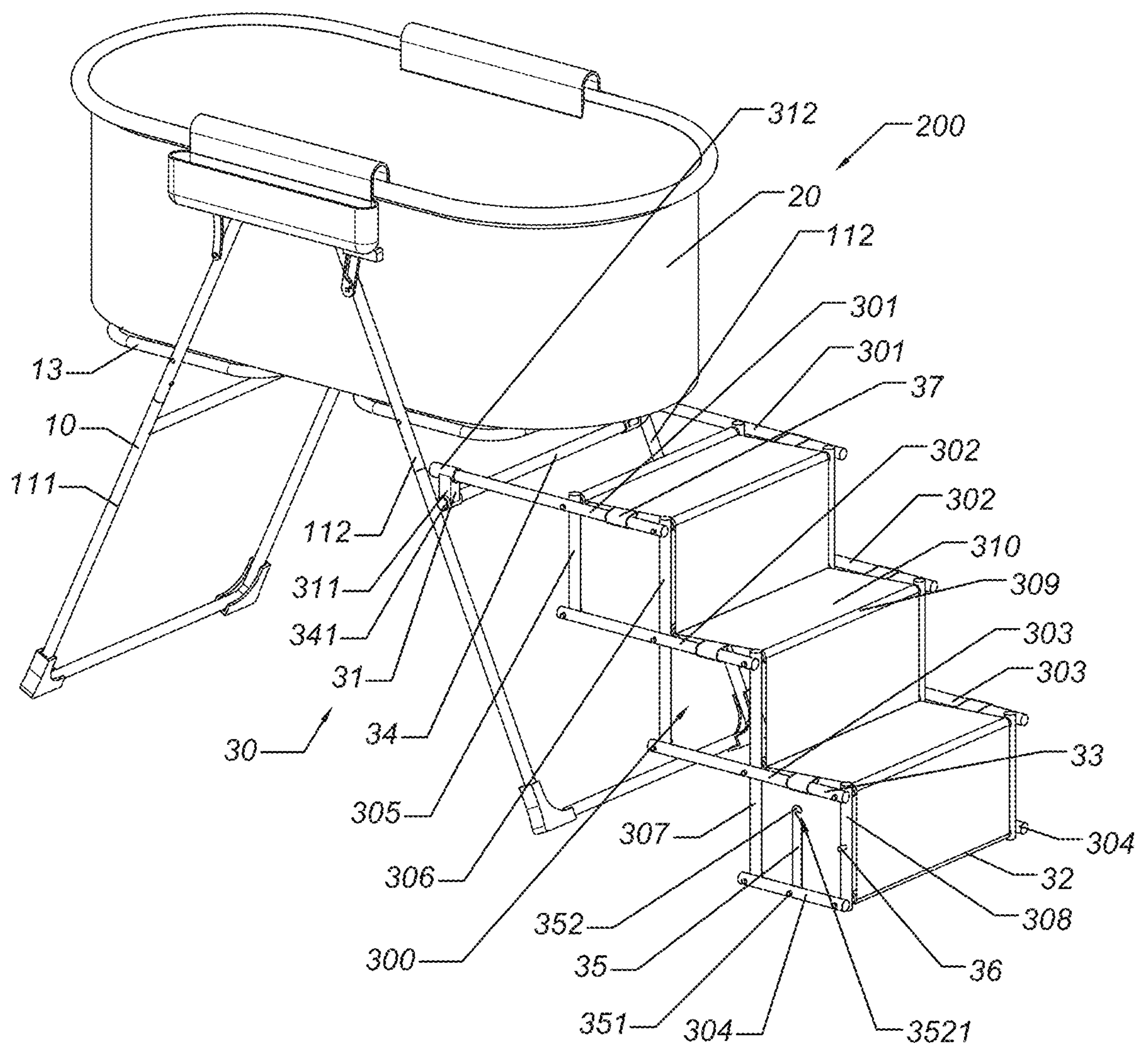
FIG. 11 is a perspective views illustrating a bath rack being in an unfolded sate according to an alternative mode of the above preferred embodiment of the present invention.
Figure 12:
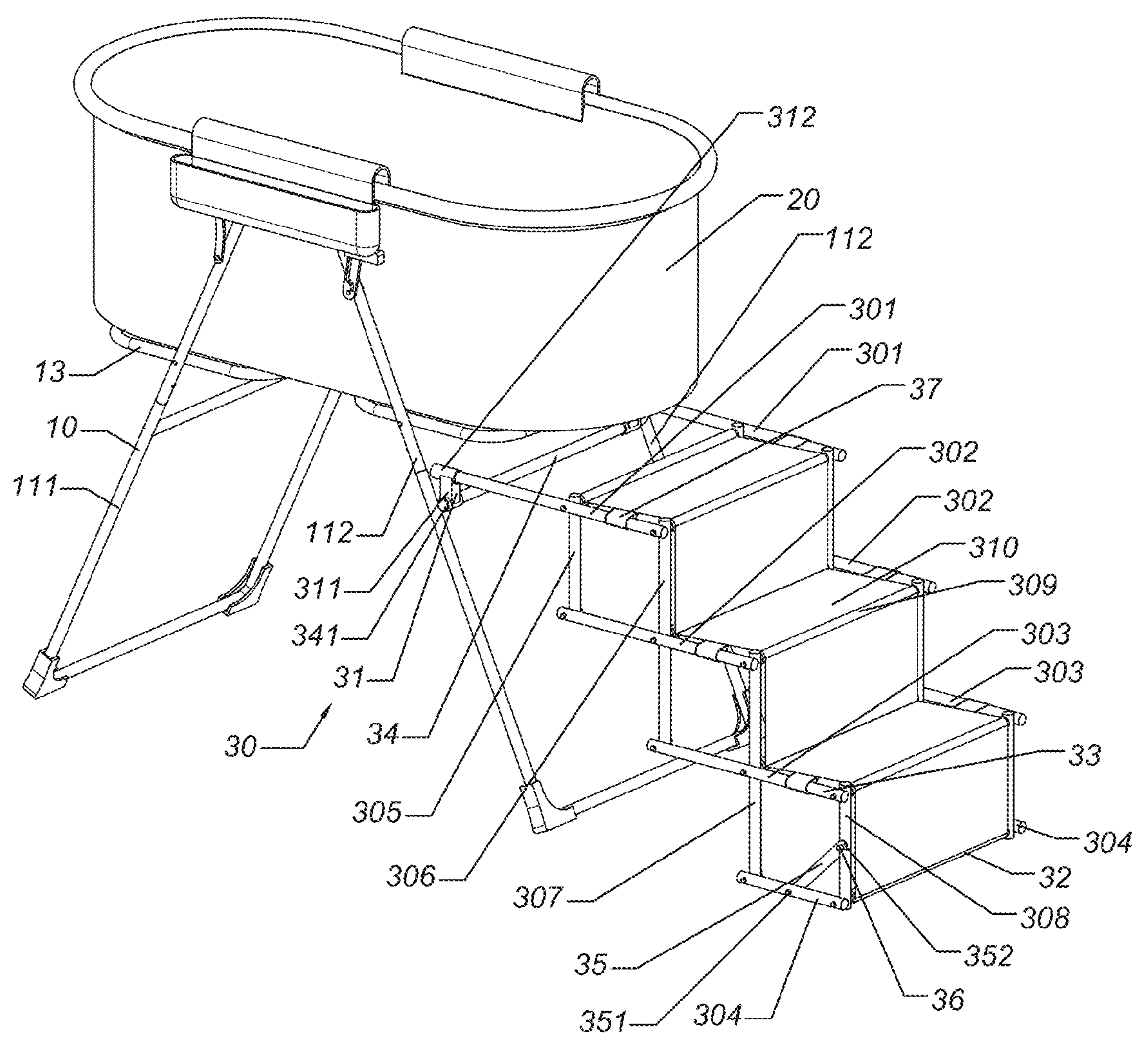
FIG. 12 is another perspective views illustrating the bath rack being in an unfolded sate according to the above alternative mode of the above preferred embodiment of the present invention, wherein a bracing arm is in a locked state.
Figure 13:
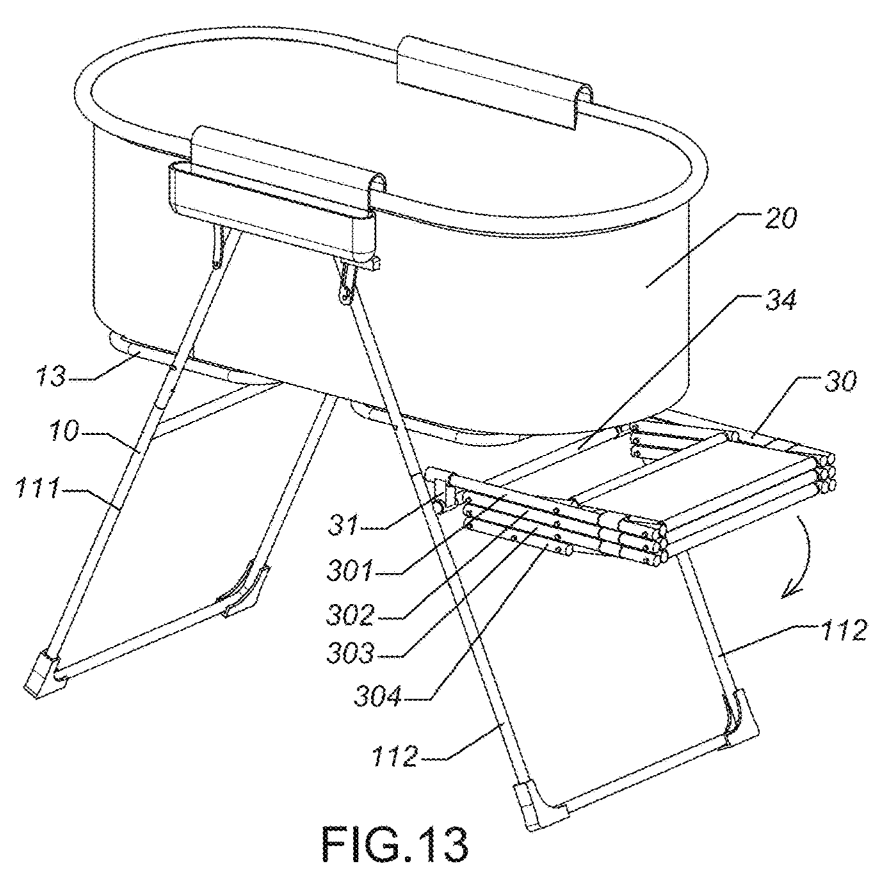
FIG. 13 is a perspective views illustrating a foldable ladder of the bath rack being in an folded sate according to the above alternative mode of the above preferred embodiment of the present invention.
Figure 14:
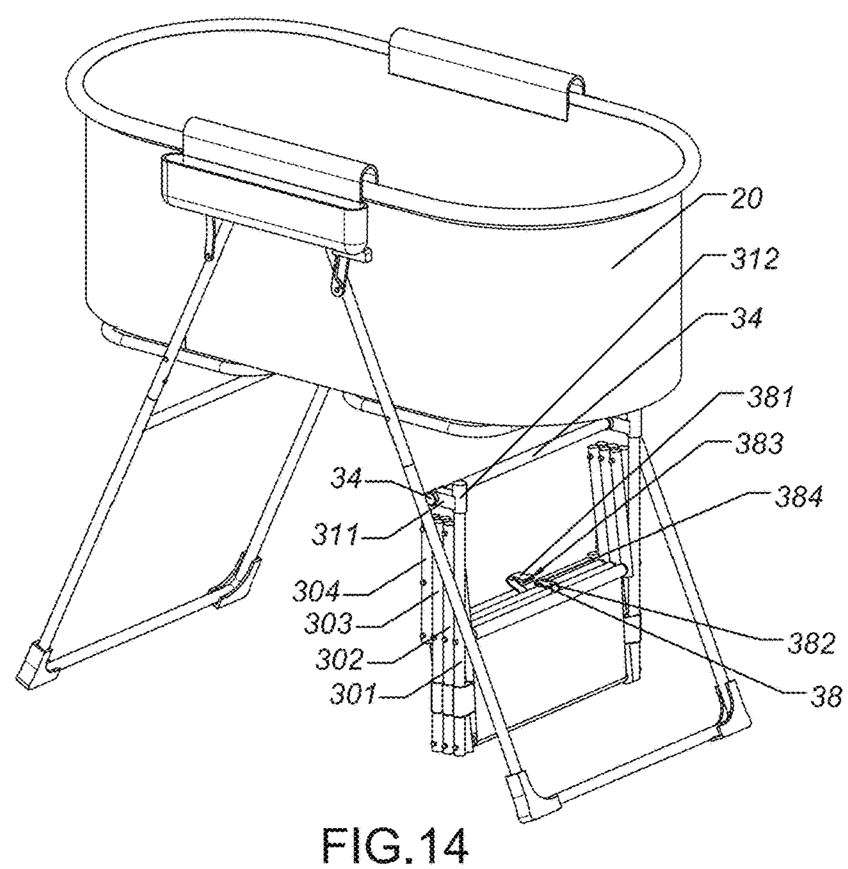
FIG. 14 is a perspective views illustrating the foldable ladder of a bath rack being in the folded sate according to the above alternative mode of the above preferred embodiment of the present invention, wherein the foldable ladder is pivotally moved to a position under the bathtub.
Figures 15, 16:
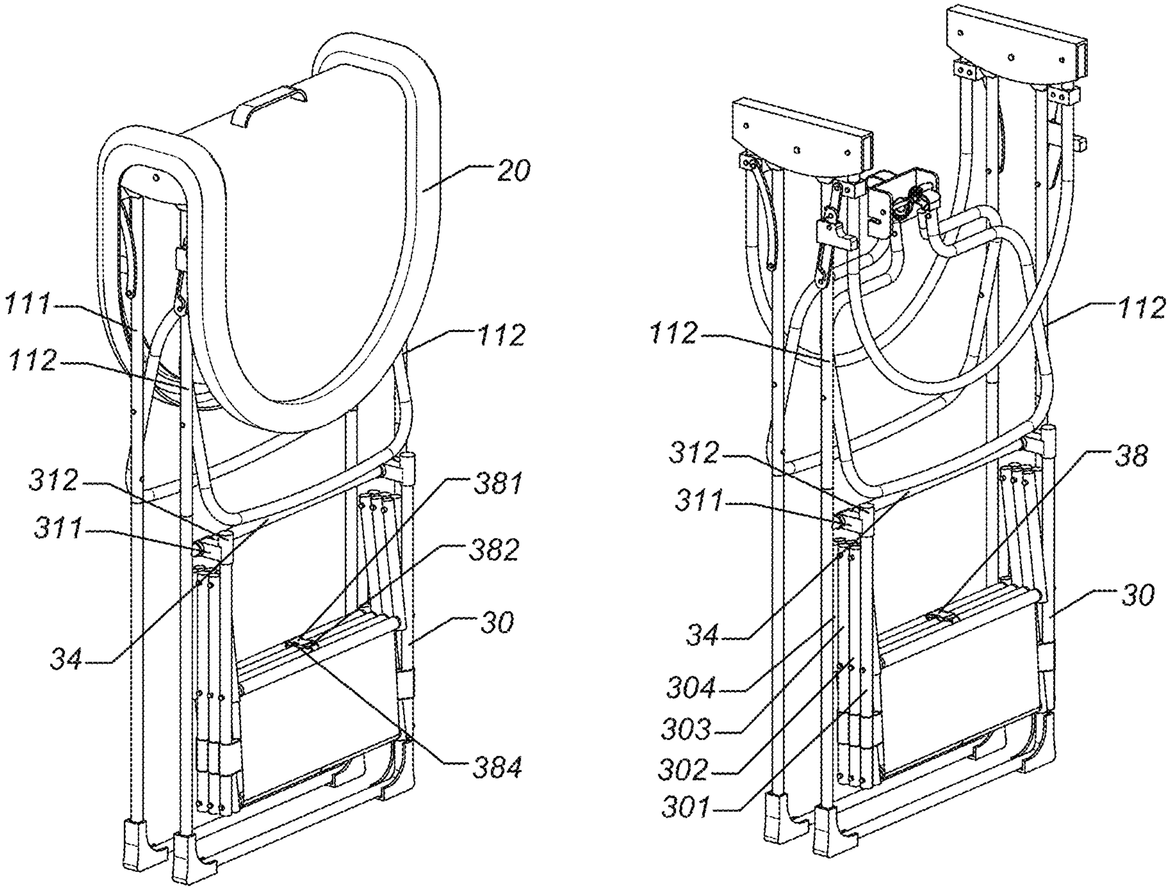
FIG. 15 is a perspective views illustrating the bath rack being in the folded sate according to the above alternative mode of the above preferred embodiment of the present invention.
FIG. 16 is a perspective views illustrating the rack body and the foldable ladder of the bath rack being in the folded sate according to the above alternative mode of the above preferred embodiment of the present invention.

As shown in FIGS. 11 and 12 of the drawings, and the biasing end 352 of the bracing arm 35 has a stopper groove 3521 and the stopper arm 36 is engaged and retained at the stopper groove 3521, so as to retain the bracing arm 35 between the fourth horizontal bar 304 and the fourth longitudinal bar 308, so as to form a stable supporting structure for the pet.

In addition, the foldable ladder 30 further comprises a plurality of bracing belts 37 which are mounted to middles of the pair of horizontal bars, so as to ensure that the horizontal bars are firmly connected to the adjacent longitudinal bars, so that the structural strength of the foldable ladder 30 is enhanced.

Figure 17:
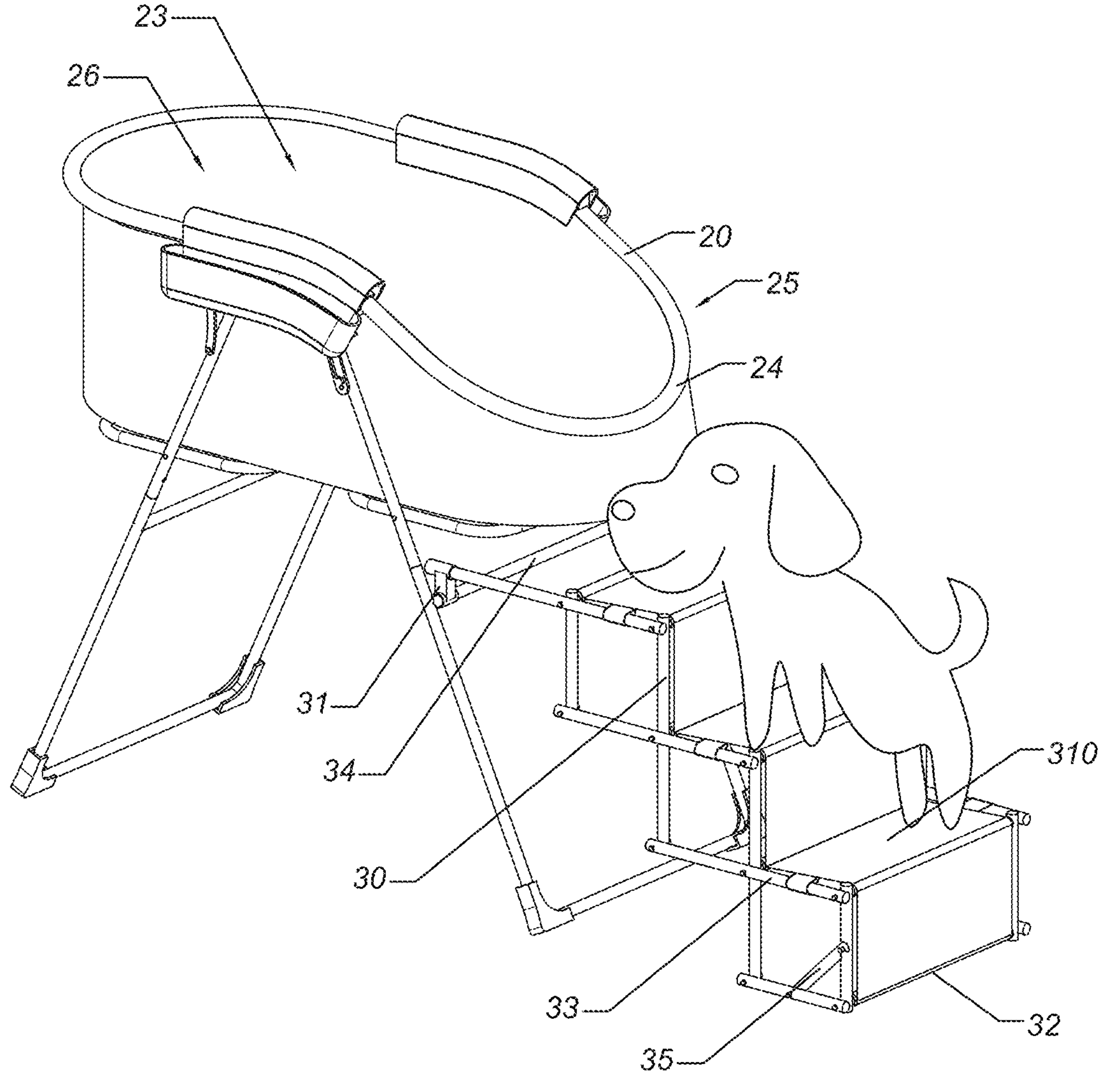
FIG. 17 is a perspective views illustrating the bath rack being in the unfolded sate for allowing the pet to enter the bathtub according to the above alternative mode of the above preferred embodiment of the present invention.
Figure 18:
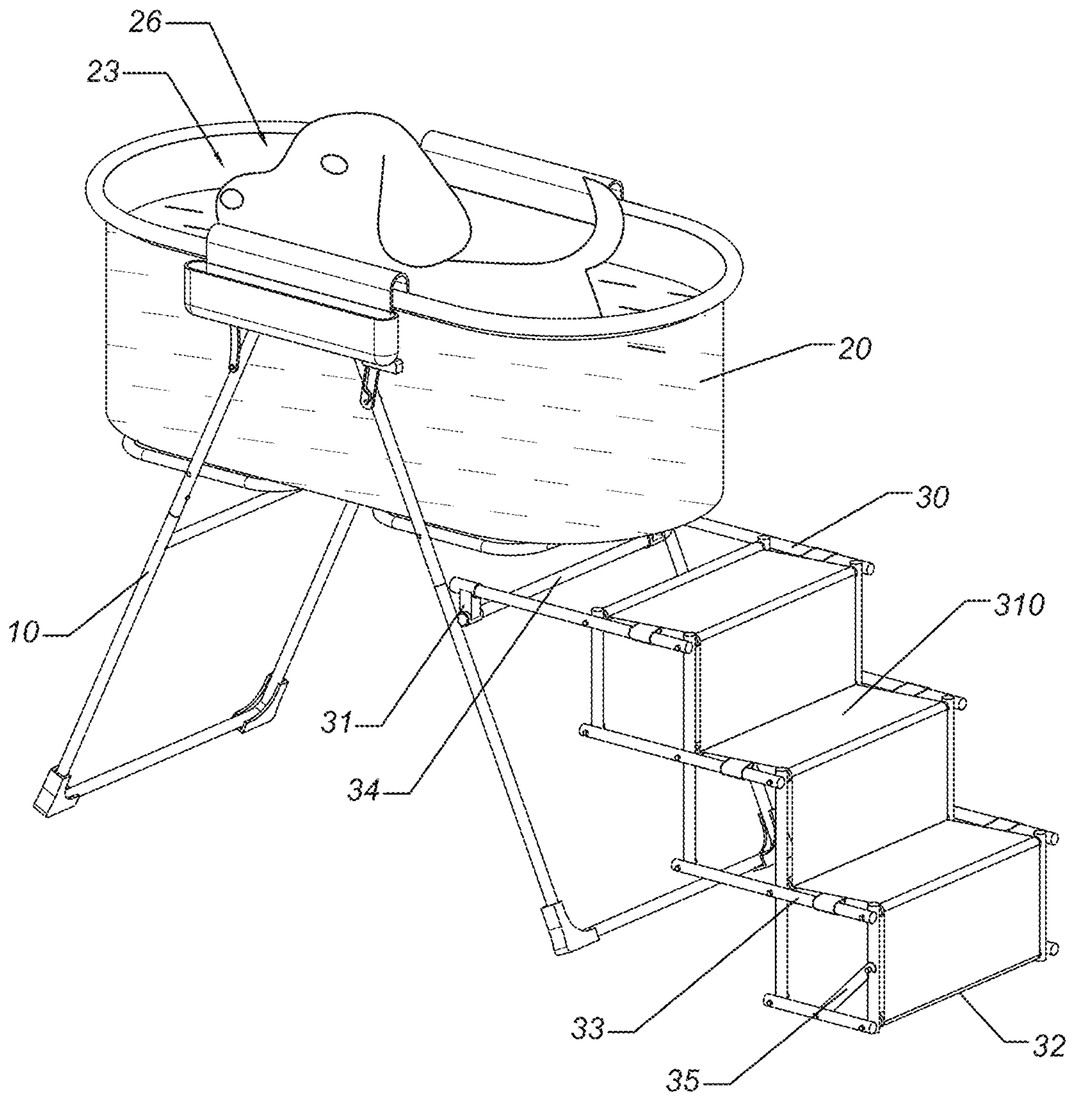
FIG. 18 is a perspective views illustrating the bath rack being in the unfolded sate for pet bathing according to the above alternative mode of the above preferred embodiment of the present invention.
Figure 19:
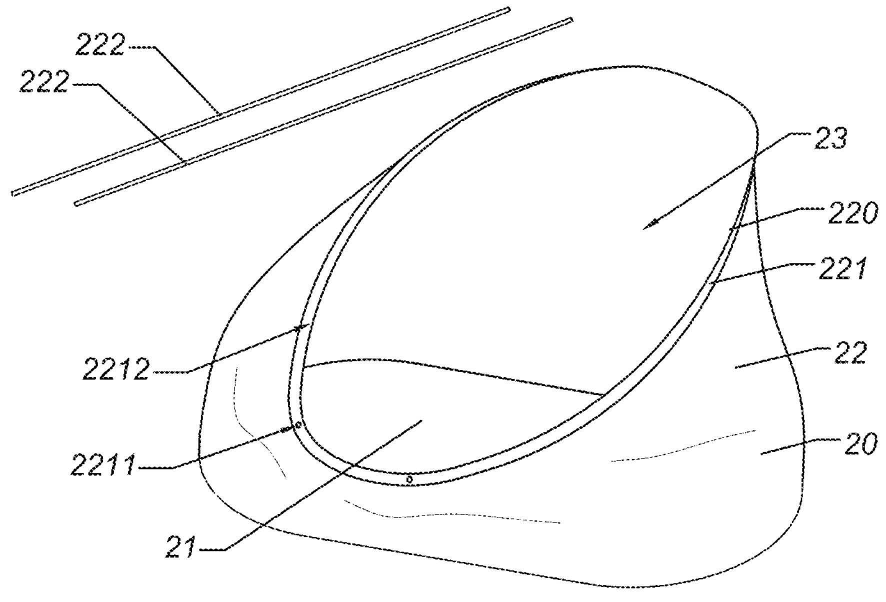
FIG. 19 is a perspective view of a bathtub of a bath rack according to an alternative mode of the above preferred embodiment of the present invention, wherein two fixing ribs are not inserted into an edge of a bathtub side wall.
Figure 20:
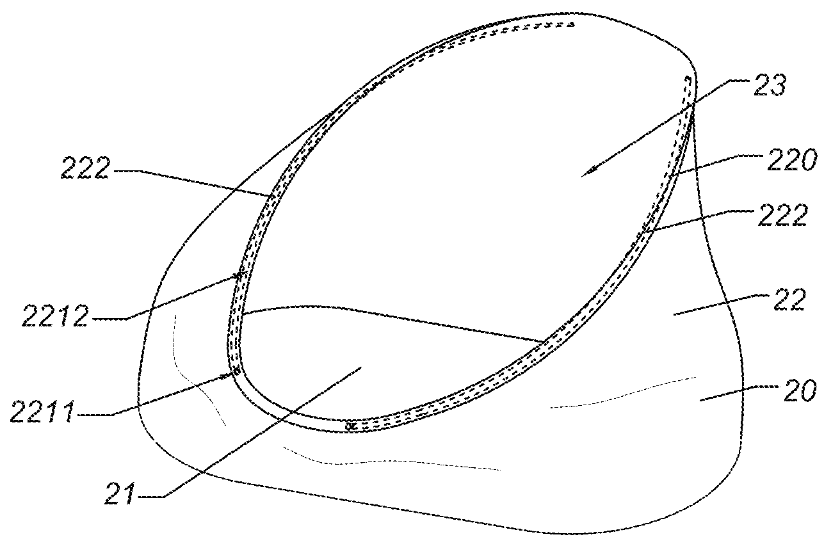
FIG. 20 is a perspective view of the bathtub of the bath rack according to the above alternative mode of the above preferred embodiment of the present invention, wherein two fixing ribs are inserted into the edge of the bathtub side wall.
Figure 21:
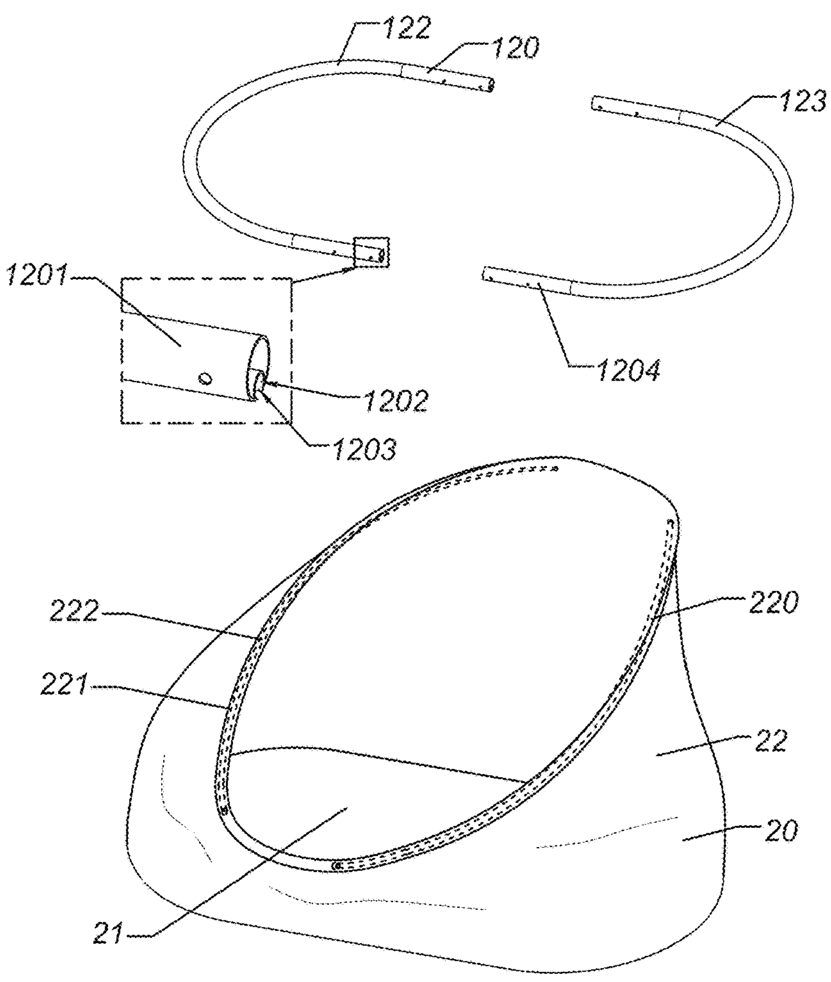
FIG. 21 is a perspective view of the bathtub assembly of the bath rack according to the above alternative mode of the above preferred embodiment of the present invention.
Figure 22:
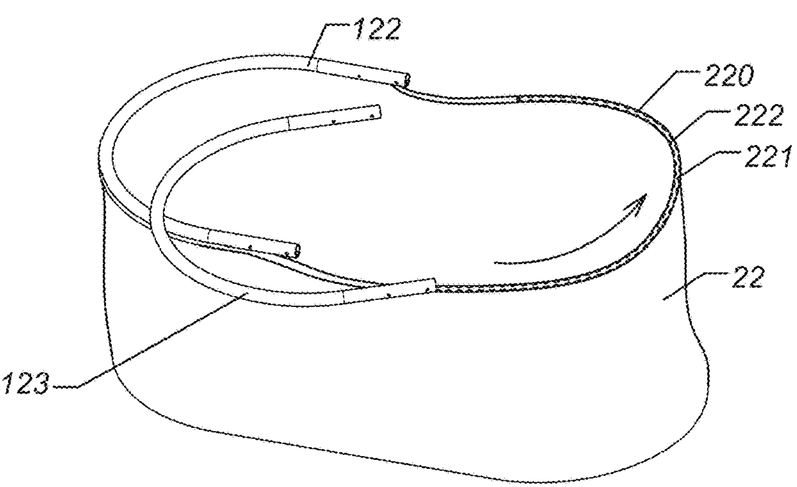
FIG. 22 is a perspective view illustrating the process for mounting brackets to the bathtub of the bath rack according to the above alternative mode of the above preferred embodiment of the present invention.
Figure 23:
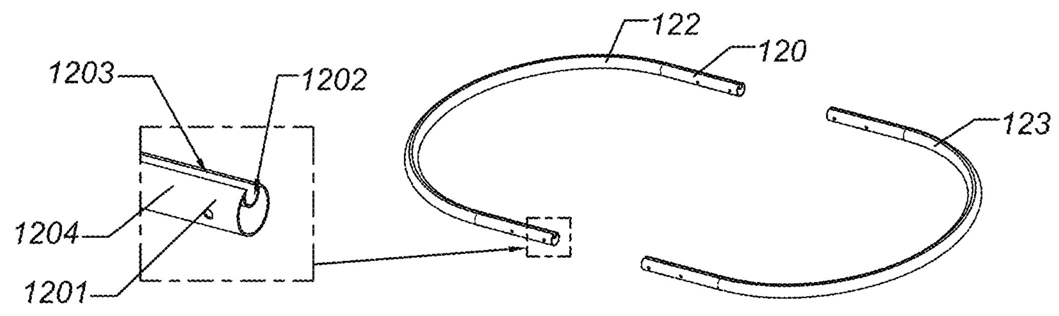
FIG. 23 is a perspective view of the brackets of the bath rack according to the above alternative mode of the above preferred embodiment of the present invention.
Figure 24:
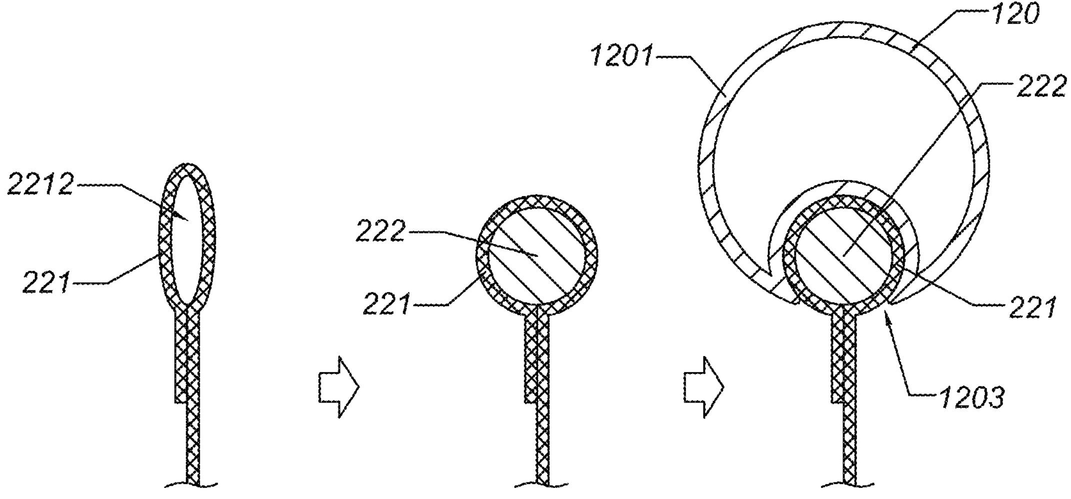
FIG. 24 are sectional views illustrating the edge of the bathtub side wall being mounted to the brackets of the bath rack according to the above alternative mode of the above preferred embodiment of the present invention.
Figure 25:
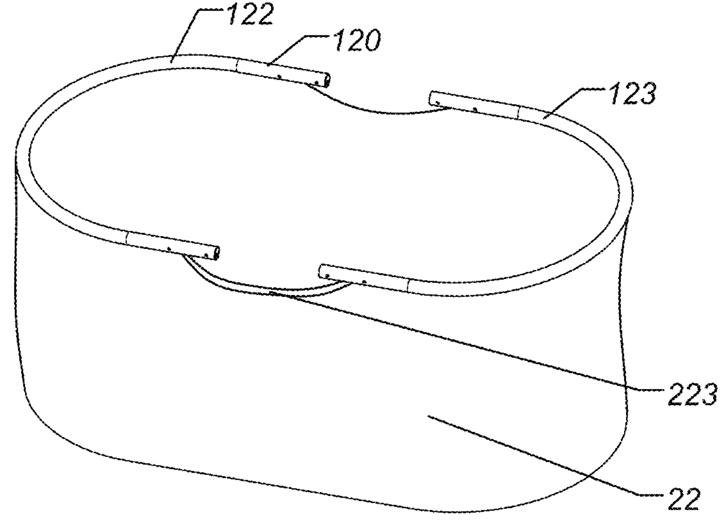
FIG. 25 is a perspective view of the assembled bathtub assembly of the bath rack according to the above alternative mode of the above preferred embodiment of the present invention.

As shown in FIG. 17 of the drawings, when the rack body 10, the bathtub 20 and the foldable ladder 30 are in the unfolded state, and when the swinging end portion 24 of the bathtub 20 is lowered down to define a lateral exit opening 25 which is communicated to the bathing space 23 in the bathtub 20, the pet can enter the bathing space 23 by stepping on the step surfaces 33 formed by the foldable ladder 30 in the unfolded state and stably supported by the horizontal bars and the longitudinal bars. And then the wining end portion 24 of the bathtub 20 is swung up so that washing liquid can be contained in the bathing space 23 of the bathtub 20 for cleaning the pet. In addition, a mattress or a supporting pad can be provided at a bottom of the bathing space 23 of the bathtub 20 to provide a flat and rigid supporting surface to the pet.

Referring to FIGS. 13 to 16 of the drawings, after use, the bath rack can be moved into the folded state in which the rack body 10, the bathtub 20 and the foldable ladder 30 are folded. M ore specifically, the mounting rod 34 of the foldable ladder 30 can be rotated downward, so as to drive the installation arms 311 to move downward, and the first horizontal bars 301 can be pivotally moved to a position that they are vertically extended, and then the rest horizontal bars 302, 303 and 304 are all pivotally moved to be parallel with the first horizontal bars 301, and the longitudinal bars 305, 306, 307 and 308 are also folded and overlapped with each other, so that the foldable ladder 30 is folded into a compact structure.

The foldable ladder 30 further comprises a lock unit 38 which comprises a lock base 381 and a lock arm 382, the lock arm 382 can be locked with the lock base 381 when the foldable ladder 30 is in the folded state, the lock base 381 and the lock arm 382 can be mounted to two connecting rods 309, so as to overlappedly align the portions of the flexible bearing surface 310, and maintain the folded configuration of the foldable ladder 30. In addition, the lock base 381 may has one or more lock groove 383, and the lock arm 382 comprises one or more lock protrusion 384, when the lock arm 382 is inserted into the lock base 381, the lock protrusion 384 can be retained at the lock groove 382 and protruded out of the lock groove 383 so as to lock the lock arm 382 with the lock base 381. Accordingly, the lock protrusion 384 can be pressed so as to allow the lock protrusion 384 to escape from the corresponding lock groove 383, so that the lock arm 382 can be detached from the lock base 381.

It is worth mentioning that when the foldable ladder 30 is in the folded state, the foldable ladder 30 can be hanging on the rack body 10 under the bathtub 20, the rack body 10 and the bathtub 30 can also be moved into the folded state without requiring to detach the foldable ladder 30 from the rack body 10 first Referring to FIGS. 19 to 27 of the drawings, a bathtub according to another alternative mode of the above preferred embodiment of the present invention is illustrated. In this embodiment, the structure for connecting the edge 220 of the bathtub side wall 22 of the bathtub 20 with the top supporting arm 11 is illustrated. Accordingly, the present invention provides a bathtub assembly 200 which comprises the bathtub 20 and two brackets 120 which are embodied as the shaping bracket 122 and the adjusting bracket 123, the edge 220 of the bathtub side wall 22 is mounted to the two brackets 120.

M ore specifically, the edge 220 of the bathtub side wall 22 comprises an edge sleeve 221 and two fixing ribs 222, the edge sleeve 221 of the bathtub side wall 22 has two mounting holes 2211 and two retaining channels 2212, each mounting hole 2211 is communicated to the corresponding retaining channel 2212, the edge 220 of the bathtub side wall 22 comprises two fixing ribs 222 which are respectively inserted into the two retaining channels 2212 through the two mounting holes 2211, so that the two fixing ribs 222 are respectively retained in the two retaining channels 2212.

Referring to FIGS. 19 to 25 of the drawings, the bathtub assembly 200 comprises two brackets 120, each of the bracket 120 comprises a rod body 1201 having a fixing cavity 1202 and a slot 1203 extended along a length of the rod body 1201 and communicated to the fixing cavity 1202.

As shown in FIGS. 20 to 25 of the drawings, each rod body 1201 is sleeved on the edge sleeve 221 of the bathtub side wall 22 through a position corresponding to the mounting hole 2211 of the edge sleeve 221, so that the edge 220 of the bathtub side wall 22 comprising the two fixing ribs 312 and the edge sleeve 221 are respectively received and retained in the fixing cavities 1202 of the two rod bodies 1201 of the two brackets 120.

Accordingly, the rack body 10 rack body 10 is a rigid frame that is made of a material selected from the group consisting of wood, metal, metal alloy, and plastic. Metal of the material of the rack body 10 rack body 10 may be Iron, Copper, or Aluminium. The bathtub 20 of the bathtub assembly 200 is preferably a flexible body that is made of a flexible water-proof material such as PE (Polyethylene), PVC (Polyvinyl Chloride), PP (Polypropylene) and TPU (Thermoplastic Urethane). Accordingly, the flexible bathtub 20 is constructed to be easy to be folded up with a folding of the rack body 10 and unfolded with an unfolding of the rack body 10, when the rack body 10 is unfolded, the rack body 10 is supported in the unfolded mode by the pivot mechanism 133 to provide a rigid support to the bathtub 20, and the pivot mechanism 133 is able to be operated to release the rigid support of the rack body 10 when the rack body 10 is operated from the unfolded state to the folded state.

The two brackets 120 can be made of rigid material such as metal, metal alloy, and plastic. The two fixing ribs 222 can be flexible rods that allow each fixing rib 222 to pass through the corresponding curved retaining channel 2212 which may have a semicircle shape. When the two fixing ribs 222 are respectively retained in the two retaining channels 2212 of the edge sleeve 221, the material of the edge sleeve 221 is sandwiched between the inner surface around the fixing cavity 1202 of the rod body 1201 of each bracket 120 and the fixing ribs 222, so that the edge sleeve 221 of the edge 220 of the bathtub side wall 22 is firmly retained and mounted by the two brackets 120. The shape and size of the fixing ribs 222 are respectively matched with the fixing cavities 1202 of the rod bodies 1201 of the two brackets 120, such as that the fixing ribs 222 are engaged with the corresponding two fixing cavities 1202 of the rod bodies 1201 of the two brackets 120 by a snap-fit engaging manner or an interference fit engaging manner, so as to prevent the fixing ribs 222 from slipping out of the fixing cavities 1202.

As an example, the two brackets 120 can be made of Aluminium, and each of the rod body 1201 is an aluminium rod. The two brackets 120 thus can provide a relatively rigid support to the bathtub 20 and the two brackets 120 define a top opening 26 of the bathtub assembly 200, the top opening 26 is also defined and surrounded by the bathtub side wall 22 of the bathtub 20. Since the two brackets 1201 are made of rigid material, the shape of the top opening 26 of the bathtub assembly 200 is maintained. The engagement between the brackets 120 and the edge 220 comprising the fixing ribs 222 and the edge sleeve 221 enables that the edge 220 has a relatively flat surface and the bathtub side wall 22 also has a flat surface that is not easy to form a wrinkle surface, so that the aesthetic appearance of the bathtub assembly 200 is further enhanced.

In addition, the engagement between the two brackets 120 and the edge 220 comprising the fixing ribs 222 and the edge sleeve 221 also enables that the edge 220 of the bathtub 20 is detachably mounted to the two brackets 120 so that the bathtub 20 can be easy to be detached from the two brackets 120 for cleaning.

Accordingly, the top side of the bathtub assembly 200 is arranged with the two brackets 120, so that the aesthetic appearance of the bathtub assembly 200 is enhanced. In other alternative modes, the two brackets 120 may be rods that can be deformed and may be inserted into the edge sleeve 221, however, the structural strength of the bathtub assembly 200 may be relatively weak and the shape of the top opening 26 of the bathtub assembly 200 may not be guaranteed. Two rigid brackets 120 are not suitable for being directly inserted into the retaining channels 2212 through the mounting holes 2211, since the operation is difficult and the surface of the bathtub side wall 22 is easy to be corrugated. Alternatively, the two brackets 120 may be rigid rods that are placed between the two layers of the material of the edge sleeve 221 and then the two layers of the material of the edge sleeve 221 are sewed with each other for retaining the two brackets 120 within the edge 220. However, this configuration will result in that the surface of the edge 220 is not flat because of the additional sewing process, and the manufacturing procedure is relatively complicated, and also the bathtub 20 is fixed to the two brackets 120 can not be detached from the two brackets 120 for cleaning.

In other words, the brackets 120 can be coupled with the edge 220 of the bathtub side wall 22 by any suitable manners, but it is preferred that the two brackets 120 are respectively engaged with the edge 220 by means of the fixing ribs 222 and the edge sleeve 221. The edge sleeve 221 is not required to be formed with a mounting slot at a top side thereof, so that the top surface of the edge sleeve 221 is flat.

In this embodiment, each of the two brackets 1201 is formed with a U-shape, and the two mounting ends 1204 of the rod bodies 1201 of the two brackets 120 are spaced with each other. Accordingly, the edge 220 of the bathtub side wall 22 define two central foldable portions 223 at two opposite sides thereof that are not received in the fixing cavities 1202 of the rod bodies 1201 of the two brackets 120, so that when the two brackets 120 are folded and overlapped with each other, the two central foldable portions 223 of the edge 220 of the bathtub side wall 22 of the bathtub 20 is folded to allow the entire bathtub 20 to be folded.

Figure 26:
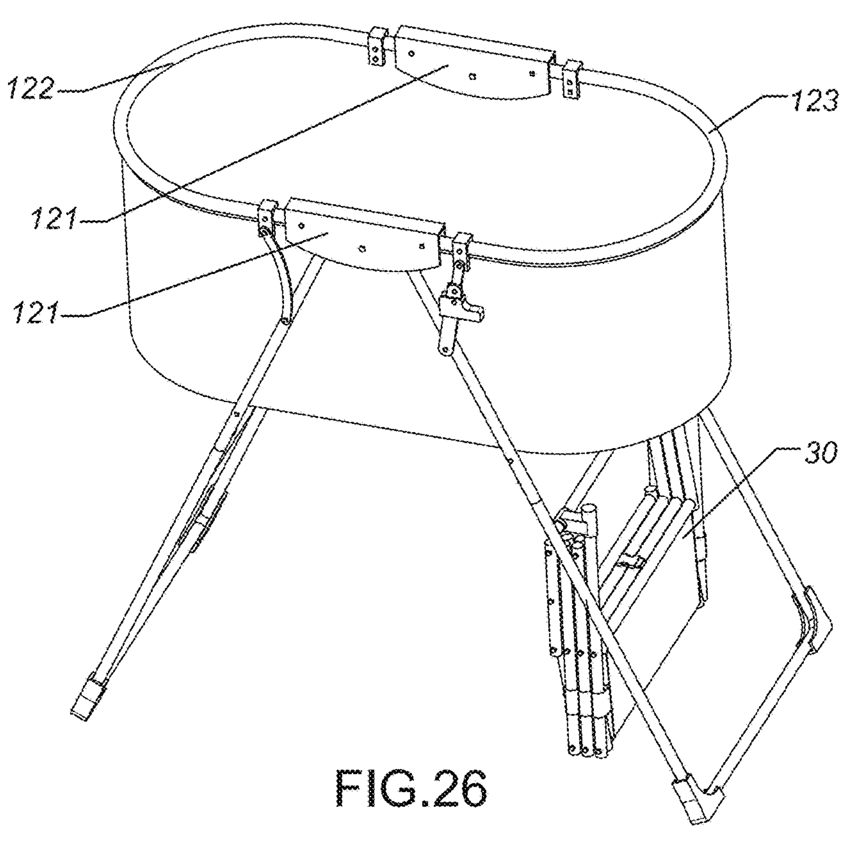
FIG. 26 is a perspective view of the foldable ladder of the bath rack being in the folded state while the rack body and the bathtub are in the unfolded state according to the above alternative mode of the above preferred embodiment of the present invention.
Figure 27:
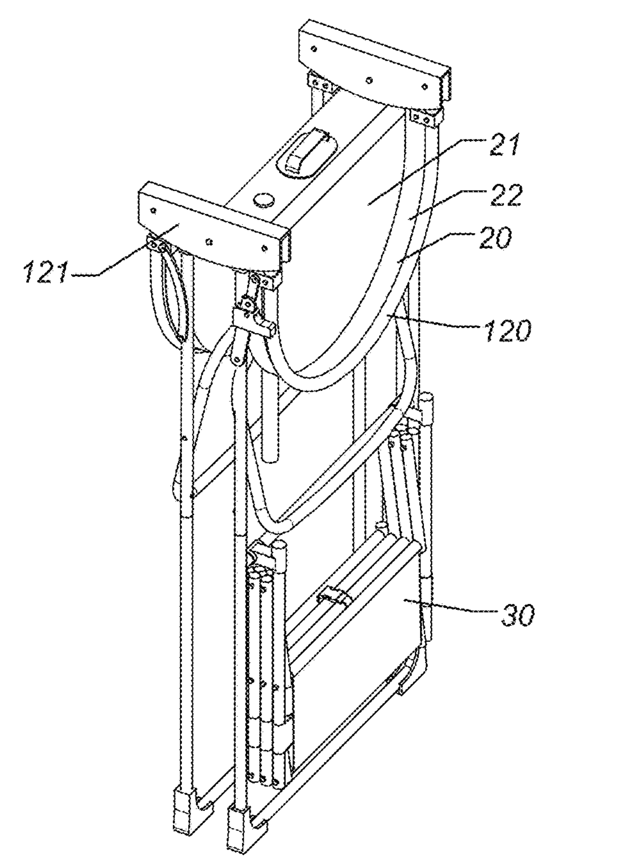
FIG. 27 is a perspective view of the foldable ladder, the rack body and the bathtub are all in the folded state according to the above alternative mode of the above preferred embodiment of the present invention.

As shown in FIG. 26 and FIG. 27 of the drawings, the two brackets 120 are pivotally mounted to the two connecting elements 121, so that the two brackets 120 are pivotally mounted with the two connecting elements 121 at positions corresponding to the central foldable portions 223 of the edge 220 of the bathtub side wall 22 of the bathtub 20, so that when the two brackets 120 are folded and overlapped with each other, the two central foldable portion 223 of the edge 220 of the bathtub side wall 22 of the bathtub 20 is folded to allow the entire bathtub 20 to be folded. Each of the two central foldable portions 223 also may be retained in the connecting element 121 so as to be hidden in the corresponding connecting element 121.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A bath rack for pet bathing, comprising:

a rack body;

a bathtub disposed on said rack body; and a foldable ladder pivotally mounted to said rack body, wherein said foldable ladder is moved between an unfolded state for allowing the pet to enter said bathtub through said foldable ladder and a folded state in which said foldable ladder is folded and pivotally moved to a position under said bathtub;

wherein said bathtub comprises a swinging end portion which is configured to swing up and down to lower and reset a height position thereof, wherein said foldable ladder is located at a position below said swing end portion of said bathtub, wherein said bathtub has a lateral exit opening when said swinging end portion swings down.

2. The bath rack according to claim 1, wherein said rack body comprises a pair of supporting legs, wherein said foldable ladder comprises a mounting rod which is rotatably mounted between said pair of supporting legs, so as to allow pivotal movement of said foldable ladder.

3. The bath rack according to claim 2, wherein said foldable ladder comprises an installation end portion transversely connected on said mounting rod and a standing end portion opposite to said installation end portion adapted for standing on a ground.

4. The bath rack according to claim 3, wherein said installation end portion of said foldable ladder comprises two installation arms which are transversely extended from two sides of said mounting rod, and a plurality of rectangular frames connected to said two installation arms of said installation end portion.

5. The bath rack according to claim 3, wherein said foldable ladder further comprise a plurality of pairs of horizontal bars and a plurality of pairs of longitudinal bars which are pivotally connected with each other to from step surfaces.

6. The bath rack according to claim 5, wherein said foldable ladder further comprises a flexible bearing surface which is covered on said step surfaces.

7. The bath rack according to claim 5, wherein said foldable ladder further comprises a plurality of bracing belts connected between said pairs of horizontal bars.

8. The bath rack according to claim 5, wherein said foldable ladder further comprises a bracing arm pivotally extended from a middle of a bottom horizontal bar of said plurality of pairs of horizontal bars, and a stopper arm extended from a bottom longitudinal bar of said plurality of pairs of longitudinal bars, wherein said bracing arm is biasing against said stopper arm when said foldable ladder is in said unfolded state.

9. The bath rack according to claim 8, wherein said bracing arm comprises a biasing end having a stopper groove, wherein said stopper arm is detachably engaged with said stopper groove of said biasing end of said bracing arm.

10. The bath rack according to claim 5, wherein said foldable ladder further comprises a plurality of connecting rods for connecting said horizontal bars and said longitudinal bars, a lock unit which comprises a lock base and a lock arm, wherein said lock base and said lock arm are respectively mounted to two said connecting rods and are capable of being locked with each other when said foldable ladder is in said folded state.

11. The bath rack according to claim 3, wherein said foldable ladder comprises a pair of first horizontal bars, a pair of second horizontal bars, a pair of third horizontal bars, a pair of fourth horizontal bars, a pair of first longitudinal bars, a pair of second longitudinal bars, a pair of third longitudinal bars, a pair of fourth longitudinal bars and a series of connecting rods, wherein said pair of said first horizontal bars, said pair of said second horizontal bars, said pair of said third horizontal bars and said pair of said fourth horizontal bars have height differences, wherein end portions of said first horizontal bars are respectively mounted to said installation end portion, wherein tops of said pair of first longitudinal bars are respectively pivotally connected to middles of said pair of first horizontal bars, and bottoms thereof are respectively pivotally connected to end portions of said pair of said second horizontal bars, wherein tops of said second longitudinal bars are respectively pivotally connected to end portions of said first horizontal bars, and middles thereof are rotatably connected to middles of said pair of second horizontal bars, wherein bottoms thereof are respectively pivotally connected to end portions of said pair of third horizontal bars, wherein tops of said pair of third longitudinal bars are respectively pivotally connected to end portions of said pair of second horizontal bars, middles thereof are respectively rotatably connected to said middles of said pair of third horizontal bars, and bottoms thereof are respectively pivotally connected to said pair of fourth horizontal bars, wherein tops of said pair of fourth longitudinal bars are respectively connected to end portions of said pair of third horizontal bars, and bottoms thereof are respectively connected to said pair of said fourth longitudinal bars, wherein tops of said pair of said first longitudinal bars, said pair of said second longitudinal bars, said pair of third longitudinal bars and said pair of said fourth longitudinal bars are respectively connected with one of said connecting bars, and said middles of said pair of said second longitudinal bars and said middles of said pair of said third longitudinal bars are respectively connected with another one of said connecting rods.

12. The bath rack according to claim 1, wherein said bathtub comprising a bathtub bottom wall and a bathtub side wall connected to said bathtub bottom wall, wherein said bathtub side wall comprises an edge which comprises an edge sleeve and two fixing ribs received in said edge sleeve, wherein said rack body comprises an opening frame which comprises two brackets, wherein each of said brackets comprises a rod body having a fixing cavity and a slot communicated to said fixing cavity, wherein said edge of said bathtub side wall of said bathtub is placed in said fixing cavity through said slot and is retained in said fixing cavity, so as to mount said bathtub with said brackets.

13. The bath rack according to claim 1, wherein said bathtub is a flexible body which is made of a flexible water-proof material selected from the group consisting of Polyethylene, Polyvinyl Chloride, Polypropylene and Thermoplastic Urethane, wherein each of said brackets is made of rigid material selected from the group consisting of wood, metal, metal alloy, and plastic.

14. A bath rack for pet bathing, comprising:

a rack body;

a bathtub disposed on said rack body; and a foldable ladder pivotally mounted to said rack body, wherein said foldable ladder is moved between an unfolded state for allowing the pet to enter said bathtub through said foldable ladder and a folded state in which said foldable ladder is folded and pivotally moved to a position under said bathtub;

wherein said rack body comprises two supporting members, an opening frame and a holding supporter, wherein said two supporting members are arranged symmetrically, and two opposite sides of said opening frame are respectively arranged on tops of said two supporting members, wherein two opposite sides of said holding supporter are respectively arranged on said two supporting members, wherein said bathtub comprises a bathtub bottom wall and a bathtub side wall upwardly extended from a periphery of said bathtub bottom wall, wherein said bathtub bottom wall is supported by said holding supporter, wherein said bathtub side wall has a top edge connected to said opening frame, wherein said bathtub comprises a swinging end portion which is configured to swing up and down to lower and reset a height position thereof, wherein said foldable ladder is located at a position below said swing end portion of said bathtub, wherein said bathtub has a lateral exit opening when said swinging end portion swings down.

* * * * *